US012768441B2

(12) United States Patent
Sugawara

(10) Patent No.: US 12,768,441 B2
(45) Date of Patent: Oct. 20, 2026

(54) WORM REDUCER AND METHOD FOR ASSEMBLING SAME

(71) Applicant: NSK STEERING & CONTROL, INC., Tokyo (JP)

(72) Inventor: Hiroyuki Sugawara, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/153,753

(22) PCT Filed: Feb. 5, 2024

(86) PCT No.: PCT/JP2024/003728
§ 371 (c)(1),
(2) Date: Aug. 5, 2025

(87) PCT Pub. No.: WO2024/166870
PCT Pub. Date: Aug. 15, 2024

(65) Prior Publication Data
US 2026/0235201 A1 Aug. 13, 2026

(30) Foreign Application Priority Data
Feb. 7, 2023 (JP) ................................ 2023-016521

(51) Int. Cl.
*F16H 57/04* (2010.01)
*B62D 3/04* (2006.01)
*F16H 57/12* (2006.01)

(52) U.S. Cl.
CPC ........... *F16H 57/0464* (2013.01); *B62D 3/04* (2013.01); *F16H 57/0498* (2013.01); *F16H 57/12* (2013.01); *F16H 2057/127* (2013.01)

(58) Field of Classification Search
CPC .. F16H 57/0464; F16H 57/0498; F16H 57/12; F16H 2057/127; F16H 1/16; F16H 2057/0213; B62D 3/04
See application file for complete search history.

(56) References Cited

U.S. PATENT DOCUMENTS 11,466,767 B2 * 10/2022 Ishii .................... F16H 57/0464
11,965,582 B2 * 4/2024 Oosawa ............... B62D 5/0454
12,228,205 B2 * 2/2025 Sugawara ............ B62D 5/0409

FOREIGN PATENT DOCUMENTS

JP 2004-306898 A 10/2004
JP 4381024 B2 12/2009
JP 2023-4553 A 1/2023

OTHER PUBLICATIONS

International Search Report (PCT/ISA/210) and Written Opinion (PCT/ISA/237) issued on Mar. 19, 2024 by the International Searching Authority in International Patent Application No. PCT/JP2024/003728.

* cited by examiner

*Primary Examiner* — Jake Cook
(74) *Attorney, Agent, or Firm* — Sughrue Mion, PLLC

(57) ABSTRACT

A worm reducer includes a holder and a pad. The holder or the pad includes a first grease supply portion for supplying grease to a contact portion between an elastic member and a pad base portion in the vicinity of a contact portion between the elastic member and the pad base portion. The holder includes a second grease supply portion for supplying grease to a contact portion between the elastic member and a protruding portion in the vicinity of the contact portion between the elastic member and the protruding portion.

9 Claims, 23 Drawing Sheets

WORM REDUCER AND METHOD FOR ASSEMBLING SAME

CROSS-REFERENCE TO RELATED APPLICATIONS

This application is a National Phase Entry of PCT International Application No. PCT/JP2024/003728 filed on Feb. 5, 2024, which claims priority to Japanese Patent Application No. 2023-016521 filed on Feb. 7, 2023, the contents of all of which are incorporated herein by reference in their respective entireties.

TECHNICAL FIELD

The present disclosure relates to a worm reducer incorporated in, for example, an electric power steering device and a method for assembling the same.

BACKGROUND ART

An electric power steering device using an electric motor as an auxiliary power source is widely used as a device for reducing a force required to operate a steering wheel when a steering angle is applied to steered wheels of an automobile.

The structure of the electric power steering device is roughly classified according to a mounting position of the electric motor. Specifically, various structures have been proposed, such as a column assist type in which auxiliary power is applied to a steering shaft rotatably supported inside a steering column, a pinion assist type in which auxiliary power is applied to a pinion shaft that is an input shaft of a steering gear unit, and a dual pinion type in which a pinion shaft different from a pinion shaft that is an input shaft is provided in a steering gear unit and auxiliary power is applied to the pinion shaft.

In any of the structures, the auxiliary power of the electric motor is applied to a shaft member that rotates or linearly moves by the operation of the steering wheel via a reducer. A worm reducer is widely used as the reducer. The worm reducer constituting the electric power steering device includes a worm rotationally driven by an electric motor and a worm wheel meshing with the worm.

FIG. 23 shows an example of a structure of the worm reducer in the related art described in Japanese Patent No. 4381024. A worm reducer 100 includes a housing 101, a worm wheel 102, and a worm 103.

The housing 101 includes a wheel accommodating portion 104 and a worm accommodating portion 105 whose central axis is at a skew position with respect to a central axis of the wheel accommodating portion 104 and whose axially intermediate portion opens into the wheel accommodating portion 104.

The worm wheel 102 has wheel teeth 106 on an outer circumferential surface thereof, and is supported and fixed coaxially with a rotation shaft 107 around the rotation shaft 107 rotatably supported inside the wheel accommodating portion 104.

The worm 103 has worm teeth 108 that mesh with the wheel teeth 106 on an outer circumferential surface of an axially intermediate portion. The worm 103 is rotatably supported inside the worm accommodating portion 105 by two ball bearings 109*a* and 109*b* at two positions in the axial direction sandwiching the worm teeth 108. Of the two ball bearings 109*a* and 109*b*, an outer ring of the ball bearing 109*a* on a tip end side (right side in FIG. 23) of the worm

103 is press-fitted into a holder 110 internally fitted and fixed inside a back end side portion of the worm accommodating portion 105. An inner ring of the ball bearing 109*a* is externally fitted to a large-diameter portion 111 provided in a portion of the worm 103 located closer to the tip end side than the worm teeth 108 with a gap therebetween via a bush 112 made of a synthetic resin. That is, the inner ring of the ball bearing 109*a* is externally fitted to the bush 112 externally fitted to the large-diameter portion 111 of the worm 103 with the gap therebetween without rattling. An outer ring of the ball bearing 109*b* on a base end side (left side in FIG. 23) of the worm 103 is internally fitted to an opening of the worm accommodating portion 105 with a gap therebetween, and the inner ring of the ball bearing 109*b* is externally fitted to a base end portion of the worm 103. An output shaft of an electric motor 113 is connected to the base end portion of the worm 103 so as to be able to transmit torque. That is, the worm 103 can be rotationally driven by the electric motor 113.

In the worm reducer 100, unavoidable backlash is present at a meshing portion between the wheel teeth 106 and the worm teeth 108 due to dimensional errors and assembly errors of components constituting the worm reducer 100. Due to the presence of the backlash, an unpleasant tooth rattling noise may occur at the meshing portion when changing a rotation direction of the steering wheel. In the illustrated example, in order to suppress the occurrence of the tooth rattling noise, a tip end portion of the worm 103 is elastically biased toward a worm wheel 102 side.

That is, the base end portion of the worm 103 is supported by the ball bearing 109*b* having a radial gap relative to the worm accommodating portion 105 so as to be slightly swingable and displaceable. An annular gap is present over the entire circumference between an outer circumferential surface of the large-diameter portion 111 of the worm 103 and an inner circumferential surface of the bush 112. A pad 114 is externally fitted to the tip end portion of the worm 103, and a torsion coil spring 115 is installed between the pad 114 and the holder 110. The pad 114 is elastically pressed by the torsion coil spring 115 toward the worm wheel 102 in a first direction (upper-lower direction in FIG. 23), which is a direction in which the worm 103 moves toward and away from the worm wheel 102 side, so that the tip end portion of the worm 103 is elastically biased toward the worm wheel 102 side (upper side in FIG. 23) in the first direction. Accordingly, the backlash between the wheel teeth 106 and the worm teeth 108 is suppressed, and the occurrence of the tooth rattling noise is suppressed.

CITATION LIST

Patent Literature

Patent Literature 1: JP4381024B

SUMMARY OF INVENTION

Technical Problem

In the structure described in Japanese Patent No. 4381024, the annular gap is present over the entire circumference between the outer circumferential surface of the large-diameter portion 111 of the worm 103 and the inner circumferential surface of the bush 112, so that the tip end portion of the worm 103 can be pressed in a direction approaching the worm wheel 102. Further, although an annular gap is smaller than the annular gap present between the outer circumferential surface of the large-diameter portion 111 of the worm 103 and the inner circumferential surface of the bush 112, the annular gap is also present over the entire circumference between the tip end portion of the worm 103 and a through hole of the pad 114. Therefore, when the rotation direction of the steering wheel is changed, that is, when the rotation direction of the worm 103 is changed, of a reaction force applied from the wheel teeth 106 to the worm teeth 108, a direction of a component in a third direction (front-back direction in FIG. 23) orthogonal to both the first direction and a second direction (left-right direction in FIG. 23), which is an axial direction of the worm accommodating portion 105, may change, and the tip end portion of the worm 103 may be displaced vigorously in the third direction. Therefore, there is room for improvement in terms of suppressing the occurrence of abnormal noise such as the tooth rattling noise.

An object of the present disclosure is to provide a worm reducer and a method for assembling the same capable of making a tip end portion of a worm less likely to be displaced in a third direction orthogonal to both a first direction, which is a biasing direction of the tip end portion, and a second direction, which is an axial direction of a worm accommodating portion, when a rotation direction of the worm is changed, and capable of improving workability of assembly work.

Solution to Problem

A worm reducer according to an aspect of the present disclosure includes a housing, a worm wheel, a worm, a holder, a pad, and an elastic member.

The housing includes a wheel accommodating portion and a worm accommodating portion that is disposed at a skew position with respect to the wheel accommodating portion and whose axially intermediate portion opens to the wheel accommodating portion.

The worm wheel has wheel teeth on an outer circumferential surface thereof and is rotatably supported inside the wheel accommodating portion.

The worm has worm teeth that mesh with the wheel teeth on an outer circumferential surface thereof and is rotatably supported inside the worm accommodating portion.

The holder includes a protruding portion and two holder engagement portions, and is disposed between the tip end portion of the worm and the worm accommodating portion.

The protruding portion includes two guide portions spaced apart from each other in a third direction orthogonal to both a first direction, which is a direction in which the tip end portion of the worm moves toward and away from the worm wheel, and a second direction, which is an axial direction of the worm accommodating portion.

The two holder engagement portions are provided on inner side surfaces of the two guide portions facing each other.

The pad includes a pad base portion, two pad engagement portions, and a pad elastic pressing portion, and is externally fitted to the tip end portion of the worm.

The pad base portion is disposed between the two guide portions.

The two pad engagement portions are provided on side surfaces one both sides of the pad base portion in the third direction and are in contact with the two holder engagement portions.

The pad elastic pressing portion elastically presses a part of the holder in the second direction to apply a preload to a contact portion between the holder engagement portion and the pad engagement portion.

The elastic member installed to extend over the protruding portion and the pad base portion and elastically biases the tip end portion of the worm toward a worm wheel side via the pad.

Particularly, in the worm reducer according to the aspect of the present disclosure, the holder or the pad includes a first grease supply portion for supplying grease to a contact portion between the elastic member and the pad base portion in the vicinity of the contact portion between the elastic member and the pad base portion, and the holder includes a second grease supply portion for supplying grease to a contact portion between the elastic member and the protruding portion in the vicinity of the contact portion between the elastic member and the protruding portion.

In the worm reducer according to the aspect of the present disclosure, the holder may include a side plate portion bent radially outward from a base end portion of the protruding portion. In this case, the first grease supply portion may be provided to penetrate, in the second direction, a portion of the side plate portion whose phase in a circumferential direction substantially coincides with the contact portion between the elastic member and the pad base portion.

In the worm reducer according to the aspect of the present disclosure, the second grease supply portion may be provided to penetrate, in the radial direction, a portion of the protruding portion whose phase in a circumferential direction substantially coincides with the contact portion between the elastic member and the protruding portion.

In the worm reducer according to the aspect of the present disclosure, the protruding portion may include a connection portion that connects an end portion of the two guide portions on a side close to the worm wheel in the first direction.

In the worm reducer according to the aspect of the present disclosure, the two holder engagement portions may be implemented by two holder inclined surfaces inclined in directions approaching each other as the two holder engagement portions approach one side in the second direction, and the two pad engagement portions may be implemented by two pad inclined surfaces in surface contact with the two holder inclined surfaces.

In the worm reducer according to the aspect of the present disclosure, the pad elastic pressing portion may include two pad elastic pressing plates located on one side in the second direction with respect to the two pad engagement portions and each extending from a central portion of the pad in the third direction toward a side away from each other in the third direction, each of the two guide portions may include a holder pressed surface on an end surface on the one side in the second direction, and each of the two pad elastic pressing plates may elastically press the holder pressed surface toward the other side in the second direction to apply a preload to the contact portion between the holder engagement portion and the pad engagement portion.

In this case, each of the two pad elastic pressing plates has a slit penetrating in the second direction and extending in the first direction at an end portion on a central side of the pad in the third direction.

In the worm reducer according to the aspect of the present disclosure, the elastic member is implemented by a plate spring.

A method for assembling the worm reducer according to the aspect of the present disclosure including steps of:

filling the inside of the worm accommodating portion with grease in a state in which the holder, the pad, and the elastic member are assembled inside the worm accommodating portion;

supplying a part of the grease to the contact portion between the elastic member and the pad base portion through the first grease supply portion, and to the contact portion between the elastic member and the protruding portion through the second grease supply portion; and internally fitting the tip end portion of the worm to the pad and disposing the tip end portion in a radially inner side of the holder.

Advantageous Effects of Invention

According to the worm reducer and the method for assembling the same of the aspect of the present disclosure, the tip end portion of the worm can be made less likely to be displaced in the third direction orthogonal to both the first direction, which is a biasing direction of the tip end portion, and a second direction, which is an axial direction of the worm accommodating portion, when a rotation direction of the worm is changed, and the workability of assembly work can be improved.

BRIEF DESCRIPTION OF DRAWINGS

FIG. 19A is a view viewed from one side in a third direction, FIG. 19B is a diagram viewed from a second direction, FIG. 19C is a diagram viewed from the other side in the third direction, and FIG. 19D is a diagram viewed from a first direction.

FIG. 20A is a perspective view, FIG. 20B is a view viewed from the first direction, and FIG. 20C is a view viewed from one side in the third direction.

DESCRIPTION OF EMBODIMENTS

First Example

A first example of an embodiment of the present disclosure will be described with reference to FIGS. 1 to 18. In this example, a case where a worm reducer of one aspect of the present disclosure is applied to a pinion assist type electric power steering device will be described. However, any worm reducer of the aspect of the present disclosure can be widely applied to a column assist type or dual pinion type electric power steering device, and a worm reducer incorporated in various mechanical devices other than the electric power steering device.

Figure 1:
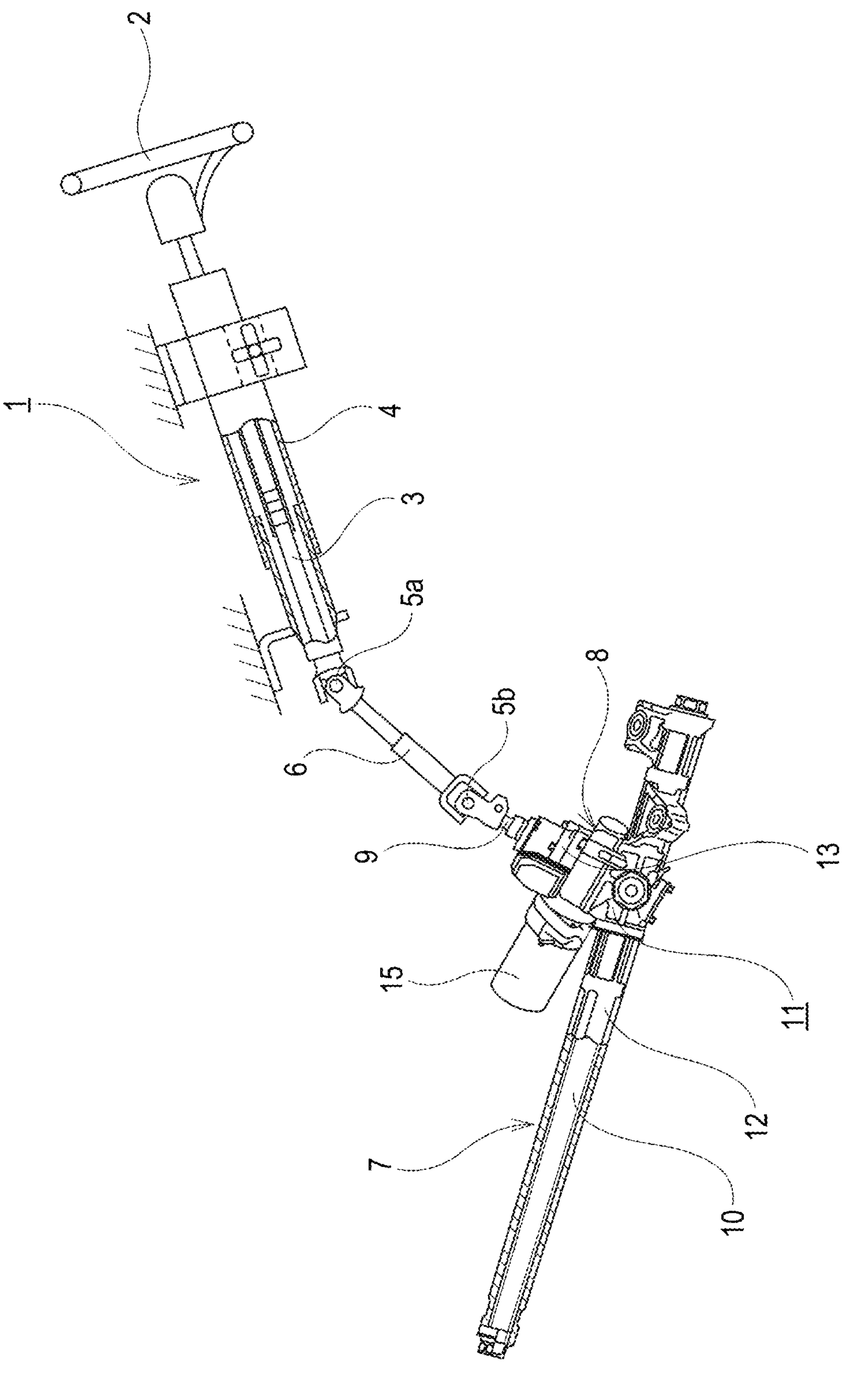
FIG. 1 is a diagram showing an electric power steering device incorporating a worm reducer according to a first example of an embodiment of the present disclosure.
Figure 2:
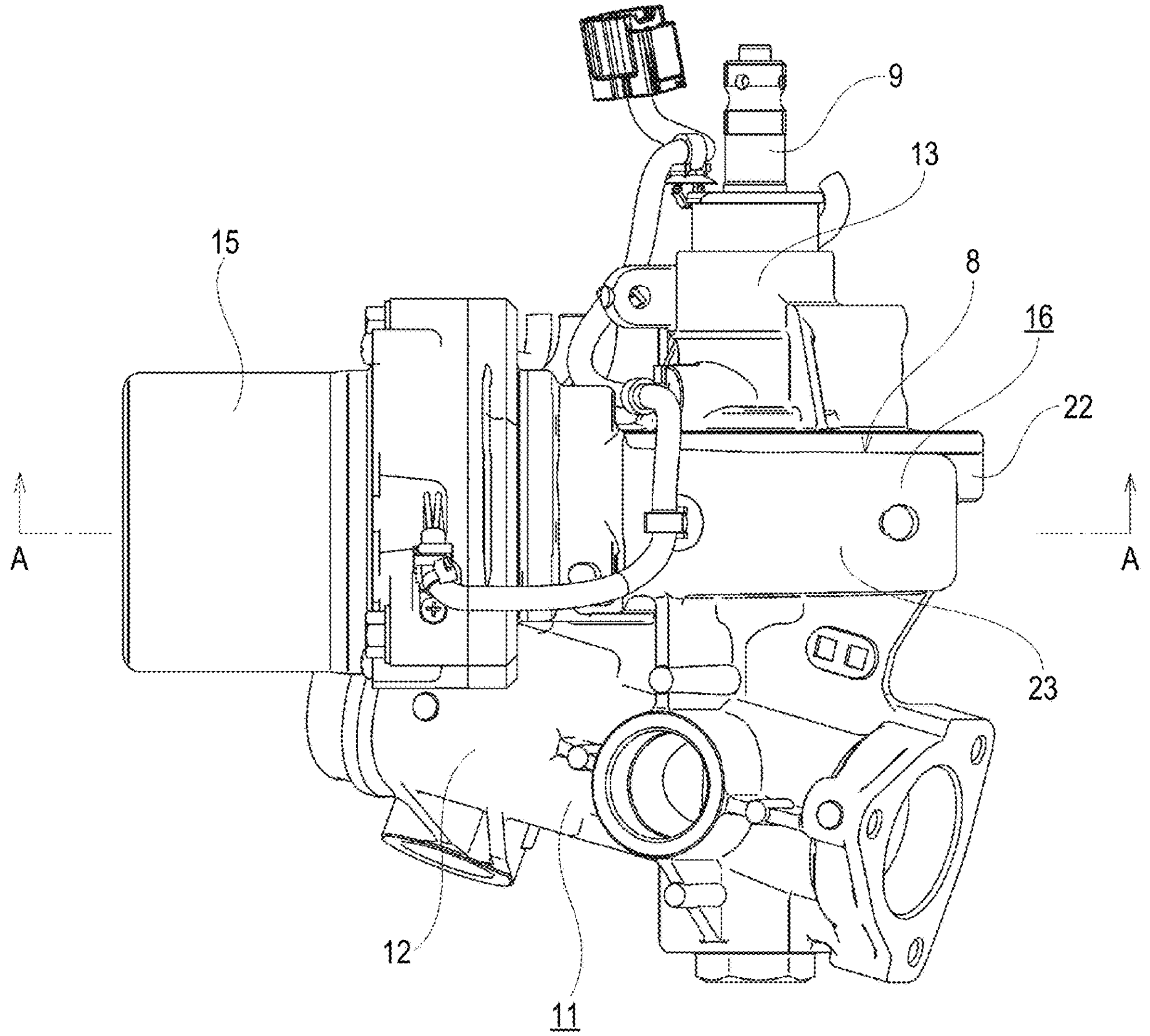
FIG. 2 is a diagram showing a part of the electric power steering device incorporating the worm reducer according to the first example of the embodiment of the present disclosure.
Figure 3:
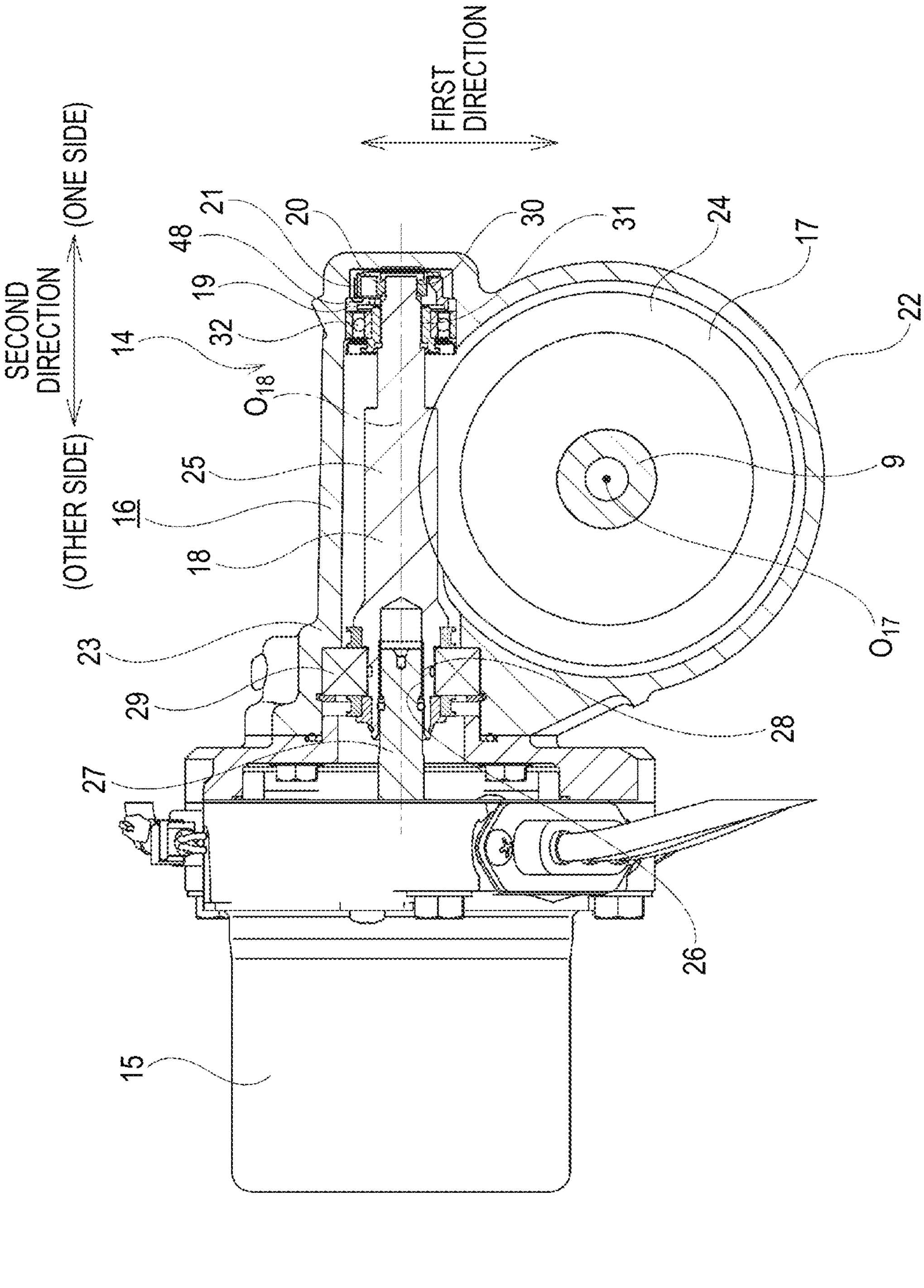
FIG. 3 is a cross-sectional view taken along a line A-A of FIG. 2.
Figure 4:
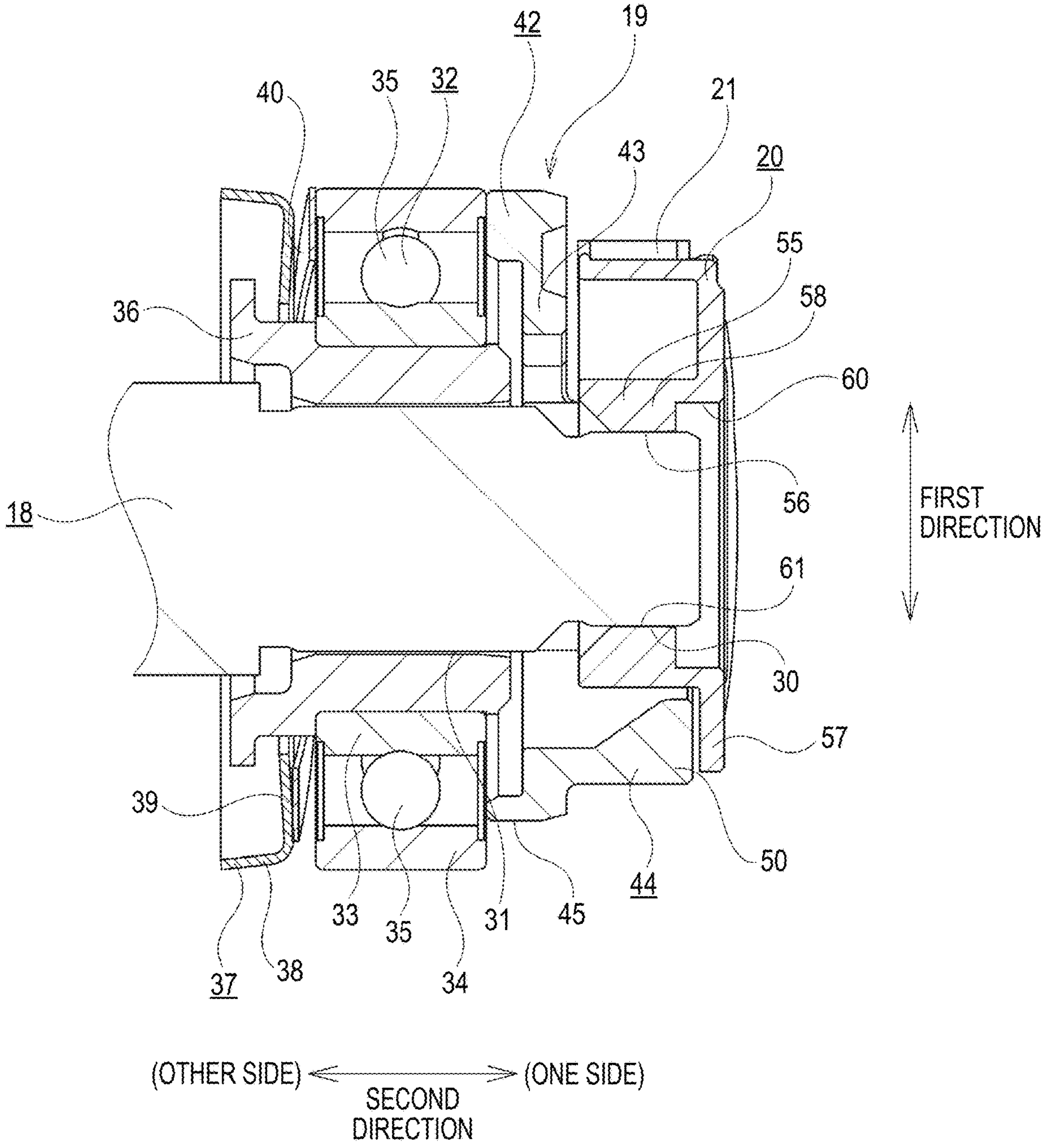
FIG. 4 is an enlarged view of an upper right portion of FIG. 3 with a housing omitted.
Figure 5:
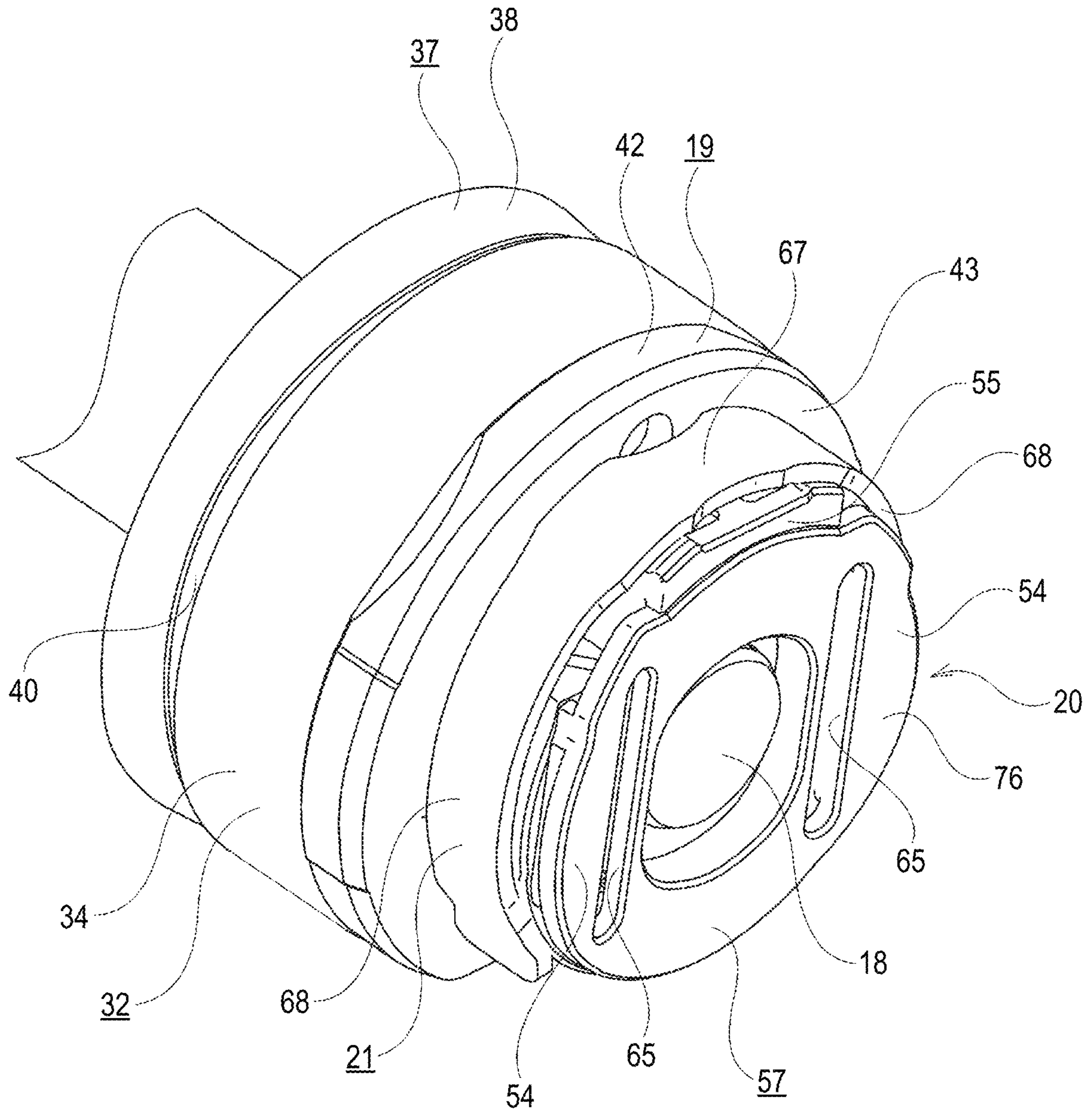
FIG. 5 is a perspective view showing a tip end portion of a worm and members disposed around the tip end portion.

FIG. 1 shows a pinion assist type electric power steering device 1 incorporating a worm reducer 14 of this example. The electric power steering device 1 includes a steering wheel 2, a steering shaft 3, a steering column 4, a pair of universal joints 5*a* and 5*b*, an intermediate shaft 6, a steering gear unit 7, and an electric assist device 8.

The steering wheel 2 is supported and fixed to a rear end portion of the steering shaft 3. The steering shaft 3 is rotatably supported inside the steering column 4 supported by a vehicle body. A front end portion of the steering shaft 3 is connected to a pinion shaft 9 of the steering gear unit 7 via the rear universal joint 5*a*, the intermediate shaft 6, and the front universal joint 5*b*. Therefore, when a driver rotates the steering wheel 2, the rotation of the steering wheel 2 is transmitted to the pinion shaft 9 via the steering shaft 3, the pair of universal joints 5*a* and 5*b*, and the intermediate shaft 6. The rotation of the pinion shaft 9 is converted into straight line motion of a rack shaft 10 of the steering gear unit 7 meshing with the pinion shaft 9. As a result, a steering angle corresponding to a rotation operation amount of the steering wheel 2 is applied to a pair of steered wheels. The electric assist device 8 applies auxiliary power generated by the electric motor 15 as a power source to the pinion shaft 9. As a result, force required by the driver to rotate the steering wheel 2 is reduced.

The steering gear unit 7 includes a housing 11 supported and fixed to the vehicle body, the rack shaft 10, and the pinion shaft 9. The housing 11 includes a rack accommodating portion 12 extending in a vehicle width direction and a pinion accommodating portion 13 connected to one side portion of the rack accommodating portion 12 in an axial direction (right side portion in FIG. 1). A central axis of the pinion accommodating portion 13 is present at a skew position with respect to a central axis of the rack accommodating portion 12. An internal space of the pinion accommodating portion 13 communicates with an internal space of the rack accommodating portion 12. The rack shaft 10 is supported inside the rack accommodating portion 12 so as to be movable only in the axial direction (vehicle width direction). The pinion shaft 9 is rotatably supported inside the pinion accommodating portion 13. The pinion shaft 9 has pinion teeth on an outer circumferential surface of a front half portion (lower half portion in FIG. 2) (not shown) disposed inside the pinion accommodating portion 13. A base end portion (upper end portion in FIG. 2) of the pinion shaft 9 protrudes to the outside of the housing 11 and is connected to the front universal joint 5*b*. The rack shaft 10 has rack teeth that mesh with the pinion teeth of the pinion shaft 9 on a part in a circumferential direction of an outer circumferential surface of the one side portion in the axial direction (right side portion in FIG. 1) (not shown) disposed inside the rack accommodating portion 12.

The electric assist device 8 includes a worm reducer 14 and an electric motor 15. The electric assist device 8 is configured to decelerate the rotation of the electric motor 15 by the worm reducer 14 and transmit the decelerated rotation to the pinion shaft 9.

The worm reducer 14 includes a housing 16, a worm wheel 17, a worm 18, a holder 19, a pad 20, and an elastic member 21.

The housing 16 includes a wheel accommodating portion 22, and a worm accommodating portion 23 that is disposed at a skew position with respect to the wheel accommodating portion 22 and whose axially intermediate portion opens to the wheel accommodating portion 22.

That is, a central axis of the wheel accommodating portion 22 and a central axis of the worm accommodating portion 23 are disposed at the skew position relative to each other. The axially intermediate portion of the worm accommodating portion 23 is integrally connected to one position in the circumferential direction of a radially outer end portion of the wheel accommodating portion 22, and an internal space of the worm accommodating portion 23 communicates with an internal space of the wheel accommodating portion 22 through the connected portion. In this example, the worm accommodating portion 23 is formed in a bottomed cylindrical shape, and specifically, a tip end (right end in FIG. 3) in the axial direction is closed, and a base end (left end in FIG. 3) in the axial direction is open.

In this example, the wheel accommodating portion 22 is coaxially and integrally connected to an axially intermediate portion of the pinion accommodating portion 13 constituting the housing 11 of the steering gear unit 7. The internal space of the wheel accommodating portion 22 communicates with the internal space of the pinion accommodating portion 13.

The worm wheel 17 has wheel teeth 24 on an outer circumferential surface thereof and is rotatably supported inside the wheel accommodating portion 22. In this example, the worm wheel 17 is externally fitted and fixed to an axially intermediate portion of the pinion shaft 9.

The worm 18 has worm teeth 25 that mesh with the wheel teeth 24 at the axially intermediate portion of an outer circumferential surface thereof, and is rotatably supported inside the worm accommodating portion 23.

In this example, a base end portion (left end portion in FIG. 3) of the worm 18 is supported so as to be slightly swingable and displaceable with respect to the worm accommodating portion 23, and is connected to an output shaft 27 of the electric motor 15 so as to be able to transmit torque.

Therefore, in this example, the worm 18 has a female spline portion 26 on an inner circumferential surface of a base end portion. The electric motor 15 is coupled and fixed to a base end portion of the worm accommodating portion 23 in the axial direction by screwing in a state in which the output shaft 27 is disposed coaxially with the worm accommodating portion 23. The female spline portion 26 of the worm 18 and a male spline portion 28 provided on an outer circumferential surface of the output shaft 27 of the electric motor 15 are spline-engaged with each other. Accordingly, the base end portion of the worm 18 and the output shaft 27 of the electric motor 15 are connected to each other so as to enable torque transmission and slight swing displacement of the worm 18. The base end portion of the worm 18 is supported by a ball bearing 29 having a radial gap relative to the worm accommodating portion 23 so as to be slightly swingable and displaceable.

In this example, an outer circumferential surface of a tip end portion of the worm 18 is implemented by a stepped cylindrical surface. That is, the outer circumferential surface of the tip end portion of the worm 18 includes a small-diameter cylindrical surface portion 30 constituting a tip end side portion and a large-diameter cylindrical surface portion 31 constituting a base end side portion and having a larger diameter than the small-diameter cylindrical surface portion 30.

In this example, a support bearing 32 is disposed between the large-diameter cylindrical surface portion 31 of the worm 18 and an inner circumferential surface of the worm accommodating portion 23. In the illustrated example, the support bearing 32 is implemented by a ball bearing. That is, the support bearing 32 includes an inner ring 33 having an inner ring raceway on an outer circumferential surface, an outer ring 34 having an outer ring raceway on an inner circumferential surface, and a plurality of balls 35 each of which is a rolling element disposed between the inner ring raceway and the outer ring raceway. However, as the support bearing 32, a rolling bearing such as a cylindrical roller bearing in which a rolling element is a cylindrical roller and a tapered roller bearing in which a rolling element is a tapered roller, or a slide bearing can also be used.

In this example, the inner ring 33 is externally fitted to the large-diameter cylindrical surface portion 31 of the worm 18 with a radial gap interposed therebetween. In this example, a cylindrical bush 36 is disposed between the inner circumferential surface of the inner ring 33 and the large-diameter cylindrical surface portion 31. Specifically, the inner ring 33 is externally fitted to an outer circumferential surface of the bush 36 by interference fitting, and the bush 36 is externally fitted to the large-diameter cylindrical surface portion 31 of the worm 18 with a gap therebetween. The bush 36 is a member for ensuring slidability and/or cushioning properties with respect to the outer circumferential surface of the tip end portion of the worm 18. The bush 36 is preferably made of a material that has a small coefficient of friction with respect to the metallic material constituting the worm

18, such as a synthetic resin or a light alloy such as an aluminum alloy. However, the bush 36 may be omitted, or a bush externally fitted to the outer ring 34 by interference fitting may be internally fitted inside the worm accommodating portion 23 with a radial gap interposed therebetween.

In this example, the outer ring 34 is internally fitted inside the worm accommodating portion 23 with the gap therebetween. Accordingly, the preload of the support bearing 32 is prevented from changing even when the housing 16 thermally expands during use. However, when thermal expansion of the housing is not particularly problematic, the outer ring may be press-fitted into the housing.

As will be described later, the outer ring 34 is sandwiched in the axial direction between the holder 19 disposed inside the worm accommodating portion 23 and a retainer 37 internally fitted and fixed inside the worm accommodating portion 23. The retainer 37 includes a fitting cylindrical portion 38 internally fitted and fixed to the inner circumferential surface of the worm accommodating portion 23 by interference fitting, and an inward flange portion 39 bent from an end portion on one side of the fitting cylindrical portion 38 in the axial direction (right side in FIGS. 3 and 4) toward a radially inner side over the entire circumference. In this example, the outer ring 34 has an end surface on one side in the axial direction abutting on a radially outer side portion of a side surface on the other side (left side in FIGS. 3 and 4) in the axial direction of an annular portion 42 of the holder 19, and a side surface on the other side in the axial direction abutting on a side surface on one side of the inward flange portion 39 in the axial direction via a wave washer 40. Accordingly, axial direction displacement of the support bearing 32 is prevented. However, the wave washer 40 may be omitted, or a wave washer may be disposed between the outer ring 34 and the holder 19.

In this example, the tip end portion of the worm 18 can be displaced in a first direction (upper-lower direction in FIGS. 3 and 4), which is a direction of moving toward and away from the worm wheel 17 and a biasing direction by the elastic member 21, based on the radial gap present between the inner circumferential surface of the inner ring 33 and the outer circumferential surface of the tip end portion of the worm 18, specifically, an annular gap present between the inner circumferential surface of the bush 36 and the large-diameter cylindrical surface portion 31.

In this example, the support bearing 32 is sandwiched between the holder 19 and the retainer 37 in the axial direction, but when the worm reducer of the aspect of the present disclosure is implemented, the arrangement mode of the support bearing is not particularly limited as long as the tip end portion of the worm can rotate with respect to the worm accommodating portion and move toward and away from the worm wheel. For example, the holder may be internally fitted and fixed inside the worm accommodating portion, and the support bearing may be internally fitted and held inside the holder.

In the worm reducer 14 of the present example, a central axis O17 of the worm wheel 17 and a central axis O18 of the worm 18 (a central axis of the output shaft 27 of the electric motor 15) are orthogonal to each other when viewed from the first direction. However, the present disclosure may also be applied to an oblique-type worm reducer in which the central axis O17 of the worm wheel 17 and the central axis O18 of the worm 18 (the central axis of the output shaft 27 of the electric motor 15) obliquely intersect each other, that is, form an acute angle when viewed from the first direction.

In the worm reducer 14 of this example, as shown in FIGS. 3 to 10, the holder 19, the pad 20, and the elastic member 21 are disposed between the small-diameter cylindrical surface portion 30 of the worm 18 and an inner circumferential surface of a tip end portion of the worm accommodating portion 23. The holder 19 is disposed between the tip end portion of the worm 18 and the worm accommodating portion 23. In this example, the holder 19 is disposed inside the worm accommodating portion 23 around the tip end portion of the worm 18 in a state in which rotation is prevented. The pad 20 is externally fitted to the tip end portion of the worm 18. In this example, the pad 20 is externally fitted to the tip end portion of the worm 18 without rattling in the radial direction. The elastic member 21 is installed to extend over a protruding portion 44 of the holder 19 and a pad base portion 55 of the pad 20, and elastically biases the tip end portion of the worm 18 toward a worm wheel 17 side (lower side in FIGS. 3 and 4) via the pad 20. Accordingly, backlash at a meshing portion between the wheel teeth 24 and the worm teeth 25 is suppressed.

The holder 19 includes the protruding portion 44 including two guide portions 49 disposed to be separated from each other in a third direction (front-back direction in FIGS. 3 and 4) orthogonal to both the first direction and a second direction (left-right direction in FIGS. 3 and 4), which is an axial direction of the worm accommodating portion 23, and two holder inclined surfaces 41, which are two holder engagement portions provided on inner side surfaces 51 of the two guide portions 49 facing each other. The two holder inclined surfaces 41 each extend in the first direction and are inclined in directions approaching each other as they approach one side in the second direction (in this example, right side in FIGS. 3 and 4). The holder 19 is preferably made of a material having sufficient strength and rigidity, for example, a metal material or a highly functional resin material such as polyphenylene sulfide (PPS) mixed with glass fiber.

More specifically, in this example, as shown in FIG. 12A to FIG. 13D and the like, the holder 19 includes an annular portion 42, a substantially circular ring-shaped side plate portion 43 extending toward the radially inner side from an end portion of the annular portion 42 on the one side in the second direction, and the protruding portion 44 extending from a radially inner end portion of the side plate portion 43 toward the one side in the second direction and having a substantially U-shaped end surface shape when viewed from the one side in the second direction.

The annular portion 42 has a partially circular end surface shape including one straight portion and one arc portion when viewed from the one side in the second direction. That is, the annular portion 42 has a flat portion 45 at one position in the circumferential direction of the outer circumferential surface (in this example, an end portion on the side close to the worm wheel 17 in the first direction). In this example, the holder 19 is held inside the worm accommodating portion 23 in a state in which the rotation is prevented by fitting the annular portion 42 into the worm accommodating portion 23 in a non-circular shape.

Figures 13A, 13B, 13C, 13D:
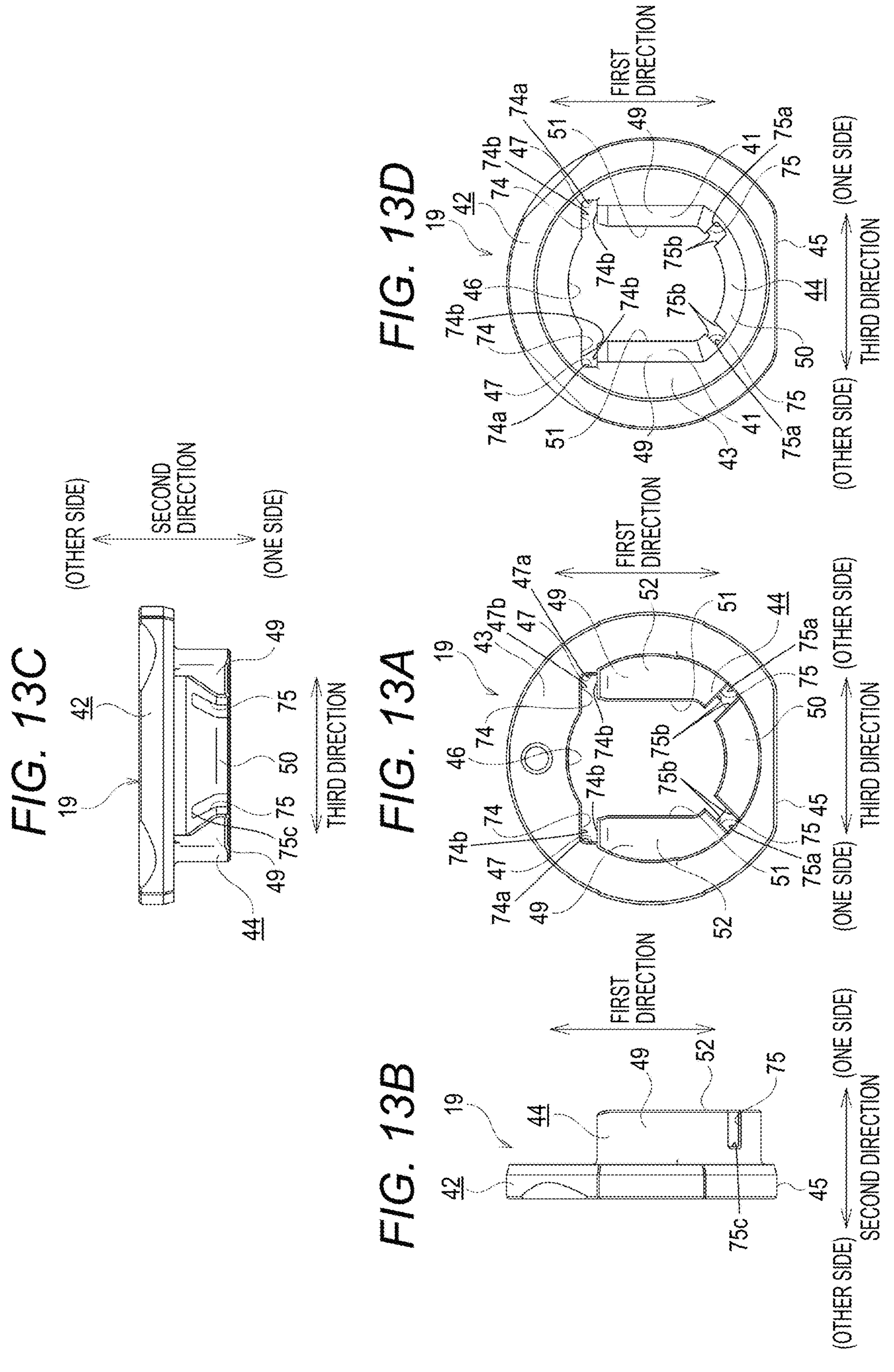
FIG. 13A is a view of the holder taken out and viewed from a right side of FIG. 4.
FIG. 13B is a view of the holder viewed from a left side of FIG. 13A.
FIG. 13C is a view of the holder viewed from an upper side of FIG. 13A.
FIG. 13D is a view of the holder viewed from a back side (left side of FIG. 4) of FIG. 13A.
Figure 14A:
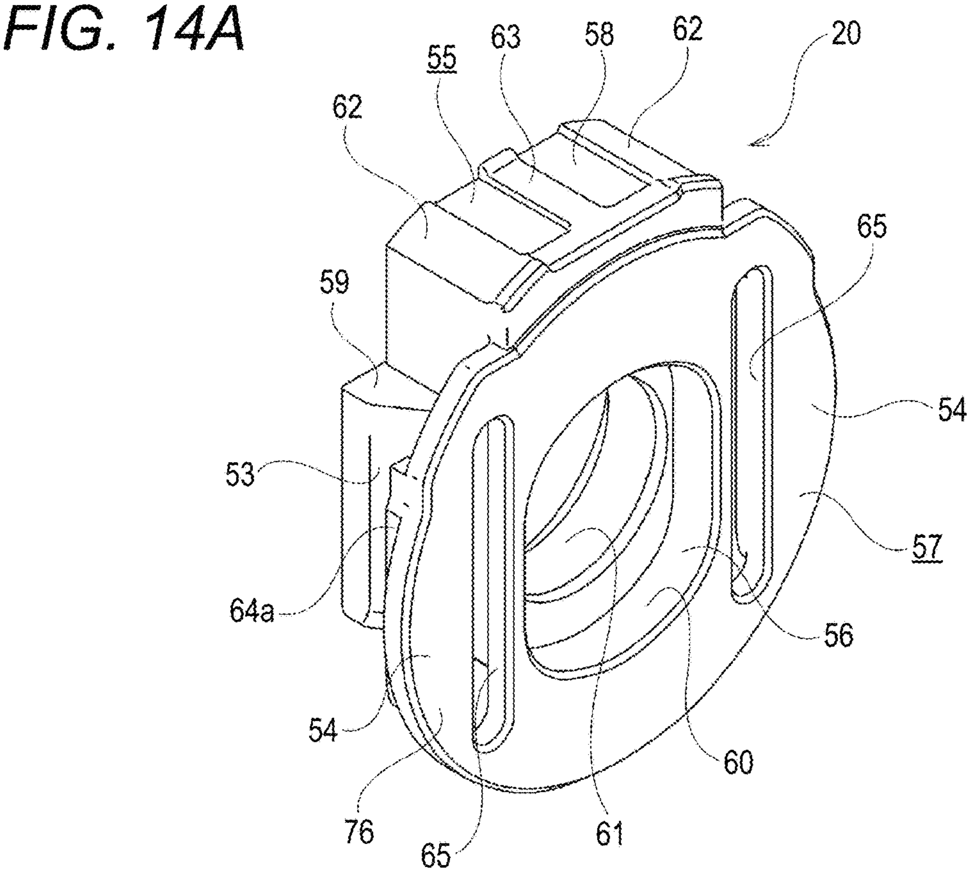
FIG. 14A is a perspective view showing a pad taken out.
Figure 14B:
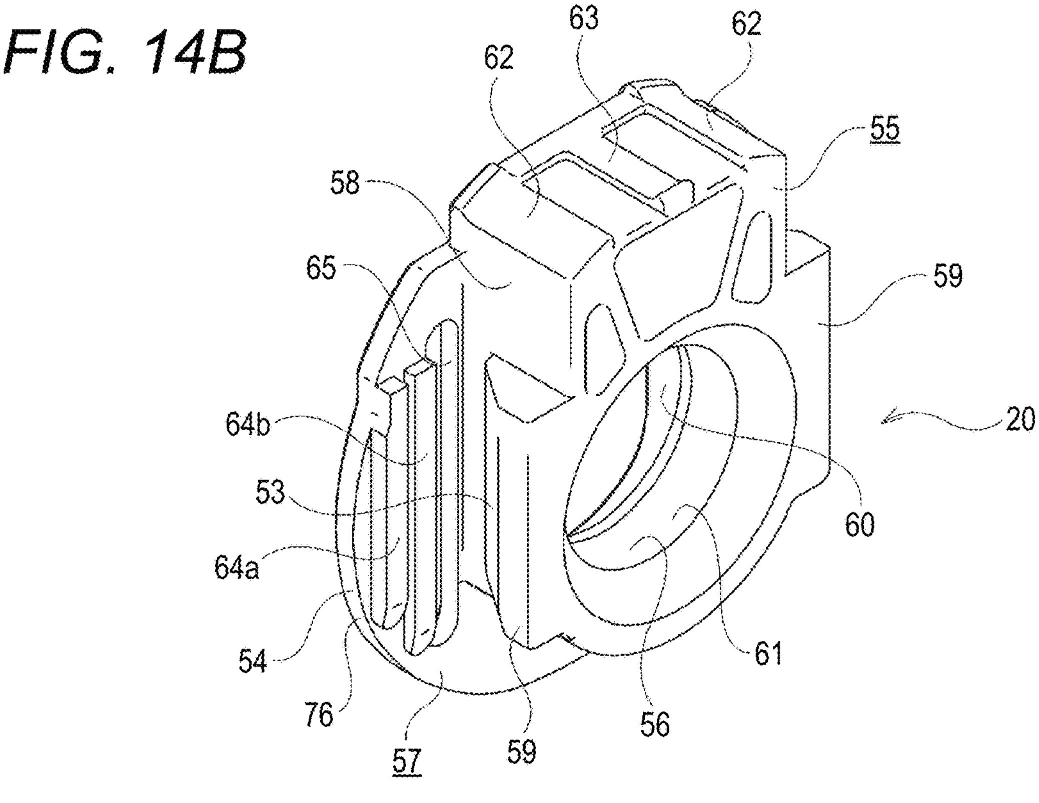
FIG. 14B is a perspective view viewed from a direction different from FIG. 14A.

In this example, as shown in FIG. 13D, an inner circumferential surface 46 of the side plate portion 43 has recessed portions 47 recessed toward both sides in the third direction on both side portions in the third direction. A bottom surface of the recessed portion 47 is implemented by a plane orthogonal to the third direction. Portions of the inner circumferential surface 46 of the side plate portion 43 outside the two recessed portions 47, that is, both side portions in the first direction, are implemented by cylindrical surfaces centered on a central axis of the holder 19.

In this example, the side surface on the one side in the second direction of the end portion on a radially outer side of the side plate portion 43 abuts on a step portion 48 (see FIG. 3) facing the other side in the second direction provided on the inner circumferential surface of the worm accommodating portion 23, thereby preventing the holder 19 from being displaced to the one side in the second direction.

In this example, the protruding portion 44 protrudes toward the one side in the second direction from a portion of the radially inner end portion of the side plate portion 43 excluding an end portion on a side far from the worm wheel 17 in the first direction. The protruding portion 44 includes the two guide portions 49 and a connection portion 50. The two guide portions 49 constitute end portions on both sides of the protruding portion 44 in the third direction. That is, as shown in FIG. 6, FIG. 12A, FIG. 13A, and FIG. 13D, the two guide portions 49 extend toward the one side in the second direction from two locations separated in the third direction, of the radially inner end portion of the side plate portion 43, specifically, from the same locations in the circumferential direction as the two recessed portions 47. The two guide portions 49 have a shape extending in the first direction.

In this example, the end portion of each guide portion 49 on the side far from the worm wheel 17 is located close to the worm wheel 17 in the first direction than the end portion of the recessed portion 47 on the side far from the worm wheel 17. In other words, when the holder 19 is viewed from the one side in the second direction, the end portion of each recessed portion 47 on the side far from the worm wheel 17 is not covered by the guide portion 49 and is exposed in the second direction.

The connection portion 50 constitutes an end portion of the protruding portion 44 on a side close to the worm wheel 17 in the first direction. That is, the connection portion 50 extends toward the one side in the second direction from the end portion, of the radially inner end portion of the side plate portion 43, on the side close to the worm wheel 17 in the first direction, and connects the end portions of the two guide portions 49 on the side close to the worm wheel 17 in the first direction. The connection portion 50 has a partially cylindrical shape centered on the central axis of the holder 19. If the holder has a strength sufficient to prevent deformation of the two guide portions, the connection portion may be omitted.

The two holder inclined surfaces 41 constituting the holder 19 are provided on the inner side surfaces 51, which are side surfaces facing each other in the third direction, of the two guide portions 49. In this example, each of the inner side surfaces 51 of the two guide portions 49 has a crank shape including a stepped surface (holder inclined surface 41) at an intermediate portion in the second direction when viewed in the first direction, as shown in FIG. 13C. That is, the two holder inclined surfaces 41 are provided at intermediate portions in the second direction of the inner side surfaces 51 of the two guide portions 49, more specifically, at one side portions of the intermediate portions in the second direction, respectively. The two holder inclined surfaces 41 are inclined in directions approaching each other as they approach the one side in the second direction. Of the inner side surfaces 51 of the two guide portions 49, portions located on the one side in the second direction with respect to the two holder inclined surfaces 41 and portions located on the other side in the second direction with respect to the two holder inclined surfaces 41 are each implemented by a plane orthogonal to the third direction. Therefore, a distance between the inner side surfaces 51 of the two guide portions 49 is narrower in a portion located on the one side in the second direction with respect to the two holder inclined surfaces 41 than in a portion located on the other side in the second direction with respect to the two holder inclined surfaces 41.

When the worm reducer according to the aspect of the present disclosure is implemented, an inclination angle q of the holder inclined surface 41 with respect to the second direction can be set to any value in the range of $0° < \varphi < 90°$, but is preferably 20° or more and 80° or less, and more preferably 30° or more and 70° or less. In this example, the inclination angle $\varphi$ is 30°.

Two holder pressed surfaces 52 constituting the holder 19 are provided on tip end surfaces of the two guide portions 49, which are end surfaces on the one side in the second direction. In this example, the two holder pressed surfaces 52 and a tip end surface of the connection portion 50, which is an end surface on one side in the second direction, are continuous with each other and are present in the same virtual plane orthogonal to the second direction.

Further, the holder 19 includes first grease supply portions 74 for supplying grease to a contact portion P1 in the vicinity of the contact portion P1 between the elastic member 21 and the pad base portion 55 that constitutes the pad 20, and second grease supply portions 75 for supplying grease to a contact portion P2 in the vicinity of the contact portion P2 between the elastic member 21 and the protruding portion 44.

In this example, the first grease supply portion 74 is provided to penetrate, in the second direction, a portion of the side plate portion 43 constituting the holder 19 whose phase in the circumferential direction substantially coincides with the contact portion P1 between the elastic member 21 and the pad base portion 55, more specifically, the contact portion P1 between an arm portion 68 of the elastic member 21 and a pressed portion 62 provided on the pad base portion 55, the portion being located radially inward from the contact portion P1. Specifically, in this example, the first grease supply portion 74 is implemented by an end portion of the recessed portion 47 provided in the side plate portion 43 on a side far from the worm wheel 17 in the first direction.

As shown in FIGS. 13C and 13D, the first grease supply portion 74 is formed by a first wall surface 74*a* extending parallel to the first direction and the second direction and a pair of second wall surfaces 74*b* and 74*b* extending parallel to the second direction and the third direction. The pair of second wall surfaces 74*b* and 74*b* face each other in the first direction. Outer end portions of the pair of second wall surfaces 74*b* and 74*b* in the third direction are connected to each other by the first wall surface 74*a*. The first wall surface 74*a* and the pair of second wall surfaces 74*b* and 74*b* are orthogonal to each other and have a substantially U shape when viewed from the second direction. As shown in FIGS. 13C and 13D, when viewed from the second direction, each of the pair of second grease supply portions 75 and 75 has a substantially rectangular cross-sectional shape recessed outward in the third direction. As shown in of FIGS. 12A and 12B, the first grease supply portion 74 penetrates the holder 19 in the second direction. The pair of first grease supply portions 74 and 74 preferably have substantially the same cross-sectional area when viewed from the second direction. In this case, the grease has excellent fluidity and contributes to improvement of coating unevenness.

Figure 18:
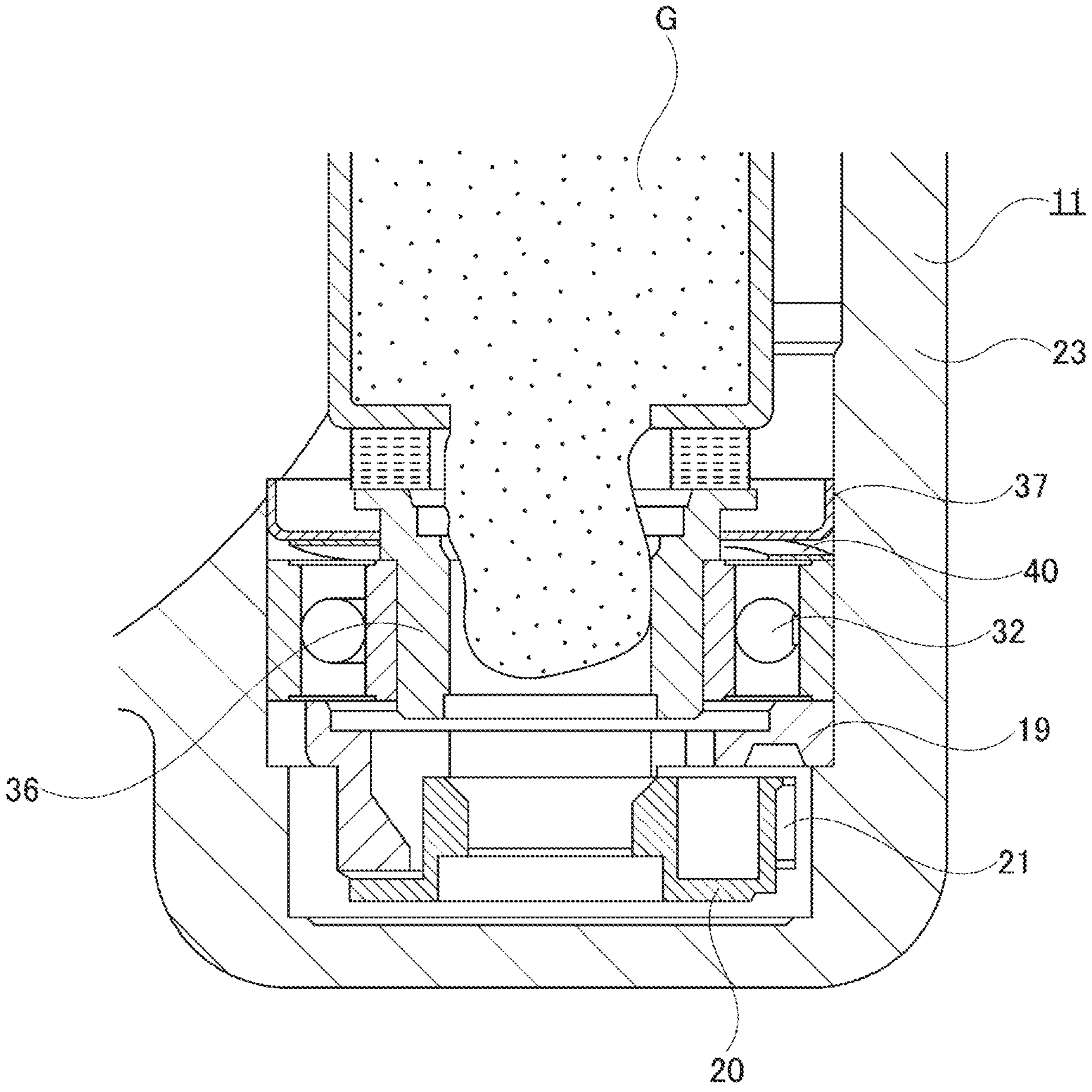
FIG. 18 is a partially enlarged cross-sectional view showing a state in which grease is filled inside a worm accommodating portion.
Figure 19C:
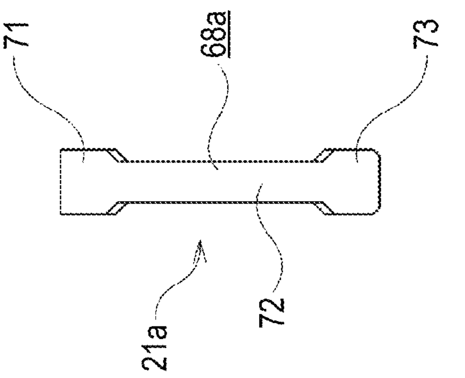
FIGS. 19A to 19D are views showing an elastic member taken out according to a second example of the embodiment of the present disclosure, where
Figure 19B:
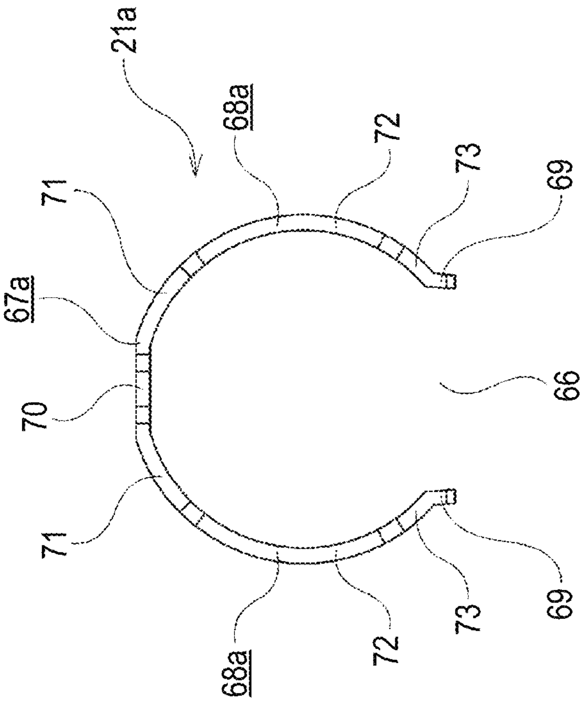
Figure 19D:
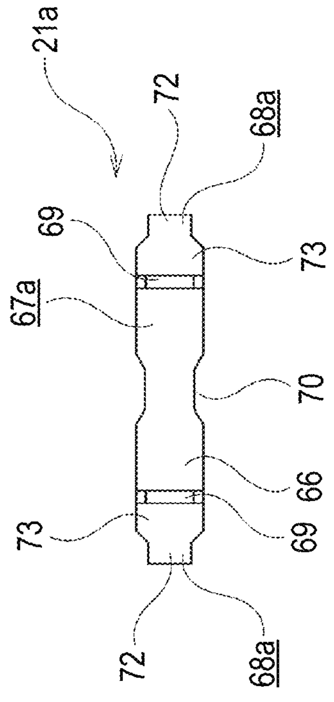
Figure 19A:
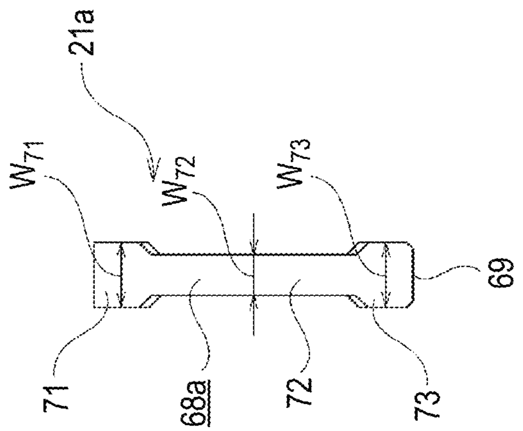

The phase of the first grease supply portion 74 in the circumferential direction and the phase of the contact portion P1 between the elastic member 21 and the pressed portion 62 in the circumferential direction need not completely coincide with each other. That is, as shown in FIG. 18 to be described later, in a state in which the holder 19, the pad 20, and the elastic member 21 are assembled inside the worm accommodating portion 23, when the grease is filled inside the worm accommodating portion 23 from the base end side (the other side in the second direction), there may be some misalignment as long as the grease can be supplied to the contact portion P1 between the elastic member 21 and the pressed portion 62 through the first grease supply portion 74 by, for example, pressure feeding. Specifically, for example, in a cross section of the virtual plane orthogonal to the second direction, an angle formed by a straight line connecting a center position in the circumferential direction of the first grease supply portion 74 to the central axis O18 of the worm 18 and a straight line connecting the contact portion P1 to the central axis O18 of the worm 18 can be within ±10 degrees, preferably within ±5 degrees.

When the worm reducer according to one aspect of the present disclosure is implemented, the pad may be provided with the first grease supply portion for supplying grease to the contact portion between the elastic member and the pressed portion. Specifically, for example, the first grease supply portion can be formed to penetrate, in the radial direction, a portion between the two pressed portions and a pedestal surface portion in an end portion of a base portion body on a side far from the worm wheel in the first direction, and an inner circumferential surface of a through hole, and to open to the side surface of the base portion body on the other side in the second direction.

In this example, the second grease supply portion 75 is provided to penetrate, in the radial direction, a portion of the protruding portion 44 whose phase in the circumferential direction substantially coincides with the contact portion P2 between the elastic member 21 and the protruding portion 44, more specifically, the contact portion P2 between the arm portion 68 of the elastic member 21 and the side surface of the connection portion 50 constituting the protruding portion 44 on the side close to the worm wheel 17 in the first direction. Specifically, in this example, the second grease supply portion 75 is provided to penetrate, in the radial direction, a connection portion between the end portion of the guide portion 49 on the side close to the worm wheel 17 in the first direction and an end portion in the circumferential direction of the connection portion 50. In this example, the second grease supply portion 75 opens to an inner circumferential surface and an outer circumferential surface of the protruding portion 44 and an end surface on one side in the second direction. That is, the second grease supply portion 75 is implemented by a recessed groove formed over a radial direction of the protruding portion 44.

As shown in of FIGS. 13C and 13D, the second grease supply portion 75 is formed by a third wall surface 75*a* extending parallel to the circumferential direction and the second direction, and a pair of fourth wall surfaces 75*b* and 75*b* extending parallel to the radial direction and the third direction. As shown in of FIGS. 13C and 13D, the pair of fourth wall surfaces 75*b* and 75*b* face each other in the circumferential direction when viewed from the second direction. Outer end portions of the pair of fourth wall surfaces 75*b* and 75*b* in the radial direction are connected to each other by the third wall surface 75*a*. The third wall surface 75*a* and the pair of fourth wall surfaces 75*b* and 75*b* are orthogonal to each other and have a substantially U shape when viewed from the second direction. As shown in FIGS. 13C and 13D, when viewed from the second direction, each of the pair of second grease supply portions 75 and 75 has a substantially rectangular cross-sectional shape recessed radially outward. As shown in FIGS. 13A and 13B, the second grease supply portion 75 has a bottomed shape having a bottom surface 75*c* on the other side in the second direction. The pair of second grease supply portions 75 and 75 preferably have substantially the same cross-sectional area when viewed from the second direction. In this case, the grease has excellent fluidity and contributes to improvement of coating unevenness.

Further, it is more preferable that the first grease supply portion 74 and the second grease supply portion 75 have substantially the same cross-sectional area when viewed from the second direction. In this case, the fluidity of the grease can be further improved.

The phase of the second grease supply portion 75 in the circumferential direction and the phase of the contact portion P2 between the elastic member 21 and the protruding portion 44 in the circumferential direction need not completely coincide with each other. That is, as shown in FIG. 18 to be described later, in the state in which the holder 19, the pad 20, and the elastic member 21 are assembled inside the worm accommodating portion 23, when the grease is filled inside the worm accommodating portion 23 from the base end side (the other side in the second direction), there may be some misalignment as long as the grease can be supplied to the contact portion P2 between the elastic member 21 and the protruding portion 44 through the second grease supply portion 75. Specifically, for example, in the cross section of the virtual plane orthogonal to the second direction, an angle formed by a straight line connecting a center position in the circumferential direction of the second grease supply portion 75 to the central axis O18 of the worm 18 and the straight line connecting the contact portion P2 to the central axis O18 of the worm 18 can be within ±10 degrees, preferably within ±5 degrees.

As shown in FIGS. 6, 10, 11, and FIG. 14A to FIG. 15D, the pad 20 includes two pad inclined surfaces 53 that are two pad engagement portions provided on both sides in the third direction and in contact with the two holder inclined surfaces 41, and a pad elastic pressing portion 76 that applies a preload to contact portions between the two holder inclined surfaces 41 and the two pad inclined surfaces 53 by elastically pressing a part of the holder 19 toward the other side in the second direction. In the present embodiment, a part of the holder 19 pressed by the pad elastic pressing portion 76 is the protruding portion 44 of the holder 19.

Figure 11:
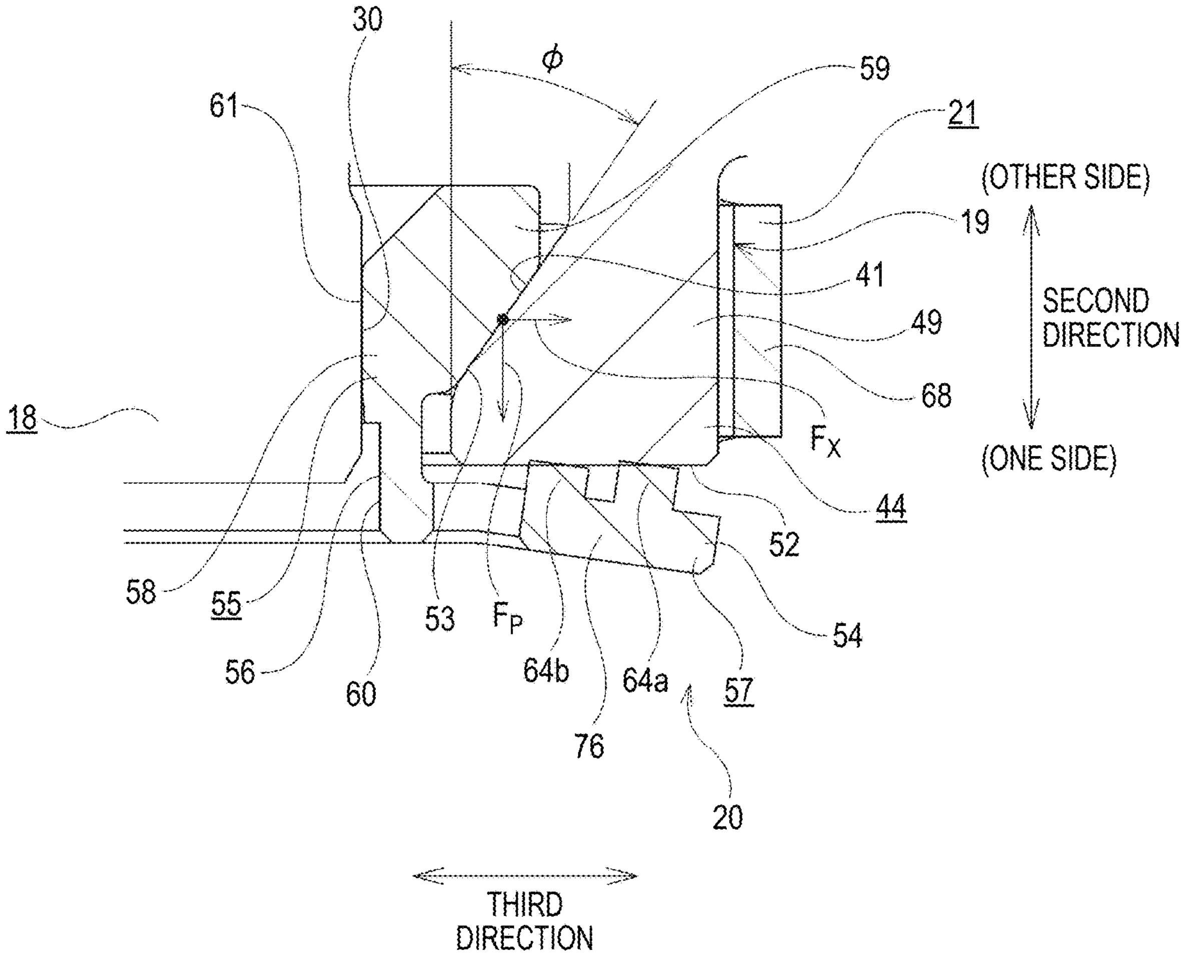
FIG. 11 is a partially enlarged view of FIG. 10.
Figure 12A:
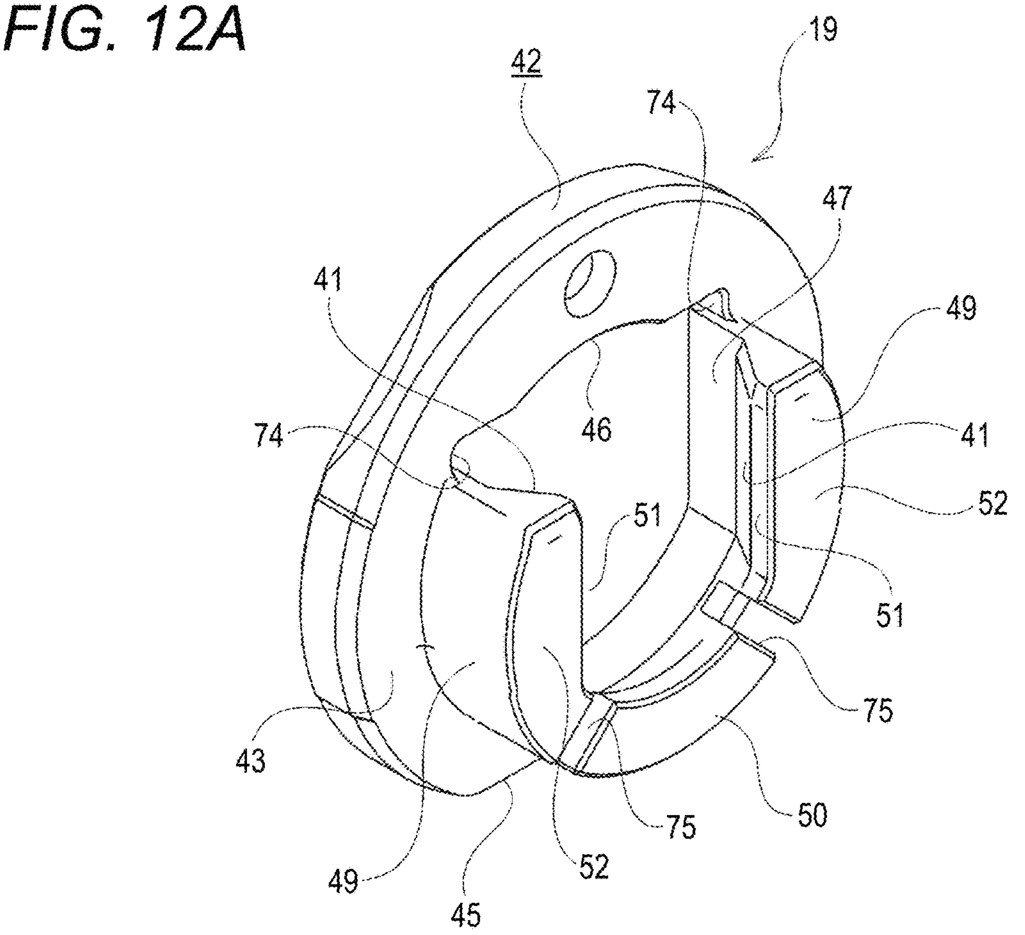
FIG. 12A is a perspective view showing a holder taken out.
Figure 12B:
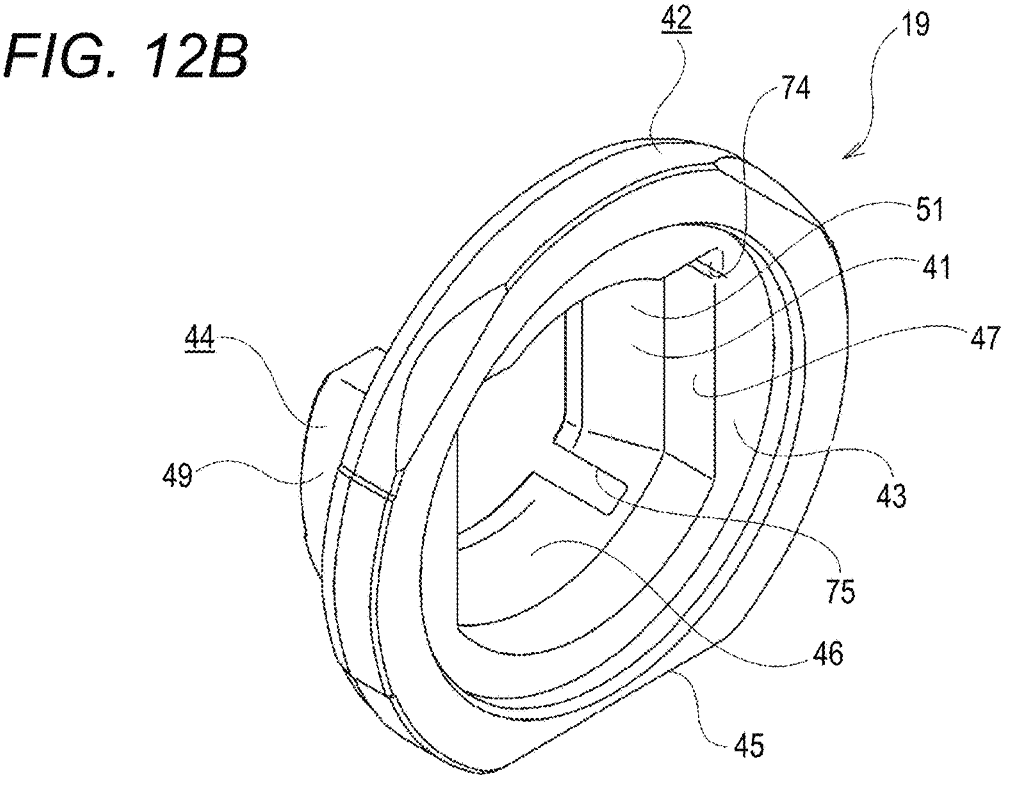
FIG. 12B is a perspective view viewed from a direction different from FIG. 12A.

In this example, the two pad inclined surfaces 53 are in surface contact with the two holder inclined surfaces 41, and specifically, are inclined at the same angle in the same direction as the two holder inclined surfaces 41 (see FIG. 11).

Further, the pad elastic pressing portion 76 includes two pad elastic pressing plates 54 that are located on the one side in the second direction with respect to the two pad inclined surfaces 53 and extend from a central portion of the pad 20 in the third direction toward sides away from each other in the third direction. The two pad elastic pressing plates 54 elastically press the two holder pressed surfaces 52 constituting the holder 19 toward the other side in the second direction.

The pad 20 is preferably made of a material that has a small coefficient of friction with respect to the metallic material constituting the worm 18, such as a synthetic resin or a light alloy such as an aluminum alloy.

In this example, the pad 20 includes the pad base portion 55 disposed between the two guide portions 49, and a through hole 56 that penetrates the pad base portion 55 in the second direction and through which the tip end portion of the worm 18 is inserted, and has the two pad inclined surfaces 53 on side surfaces on both sides of the pad base portion 55 in the third direction, and a flat plate portion 57 including the two pad elastic pressing plates 54 is connected to a portion of the pad base portion 55 protruding from between the two guide portions 49 to the one side in the second direction.

The pad base portion 55 includes a base portion body 58 and two base portion overhang portions 59.

The base portion body 58 extends in the first direction and has a substantially rectangular end surface shape. The through hole 56 penetrates, in the second direction, a half of the base portion body 58 on a side close to the worm wheel 17 in the first direction. In this example, the through hole 56 is implemented by a stepped hole having an oval hole portion 60 on the one side in the second direction and a circular hole portion 61 on the other side in the second direction. The circular hole portion 61 has an inner diameter slightly larger than an outer diameter of the small-diameter cylindrical surface portion 30 of the worm 18.

Further, the base portion body 58 has, at an end portion on a side far from the worm wheel 17 in the first direction, two pressed portions 62 at end portions on both sides in the third direction of the other side portion in the second direction. Each of the two pressed portions 62 is implemented by a partially cylindrical surface centered on a central axis of the through hole 56. However, when the worm reducer of the aspect of the present disclosure is implemented, the base portion body may have one pressed portion at one position of an end portion on a side far from the worm wheel in the first direction. In this example, the base portion body 58 has a pedestal surface portion 63 implemented by a flat surface orthogonal to the first direction at an end portion on a side far from the worm wheel 17 in the first direction and between the two pressed portions 62 in the third direction.

The two base portion overhang portions 59 protrude from a portion, of a half of the base portion body 58 on the other side in the second direction, on a side close to the worm wheel 17 in the first direction toward sides away from each other in the third direction. Each of the two base portion overhang portions 59 extends in the first direction.

In this example, the two pad inclined surfaces 53 constituting the pad 20 are provided on side surfaces on the one side in the second direction of the two base portion overhang portions 59. The two pad inclined surfaces 53 are inclined in directions approaching each other as they approach the one side in the second direction. An inclination angle φ of the pad inclined surface 53 with respect to the second direction is the same as the inclination angle q of the holder inclined surface 41 with respect to the second direction.

Figure 16:
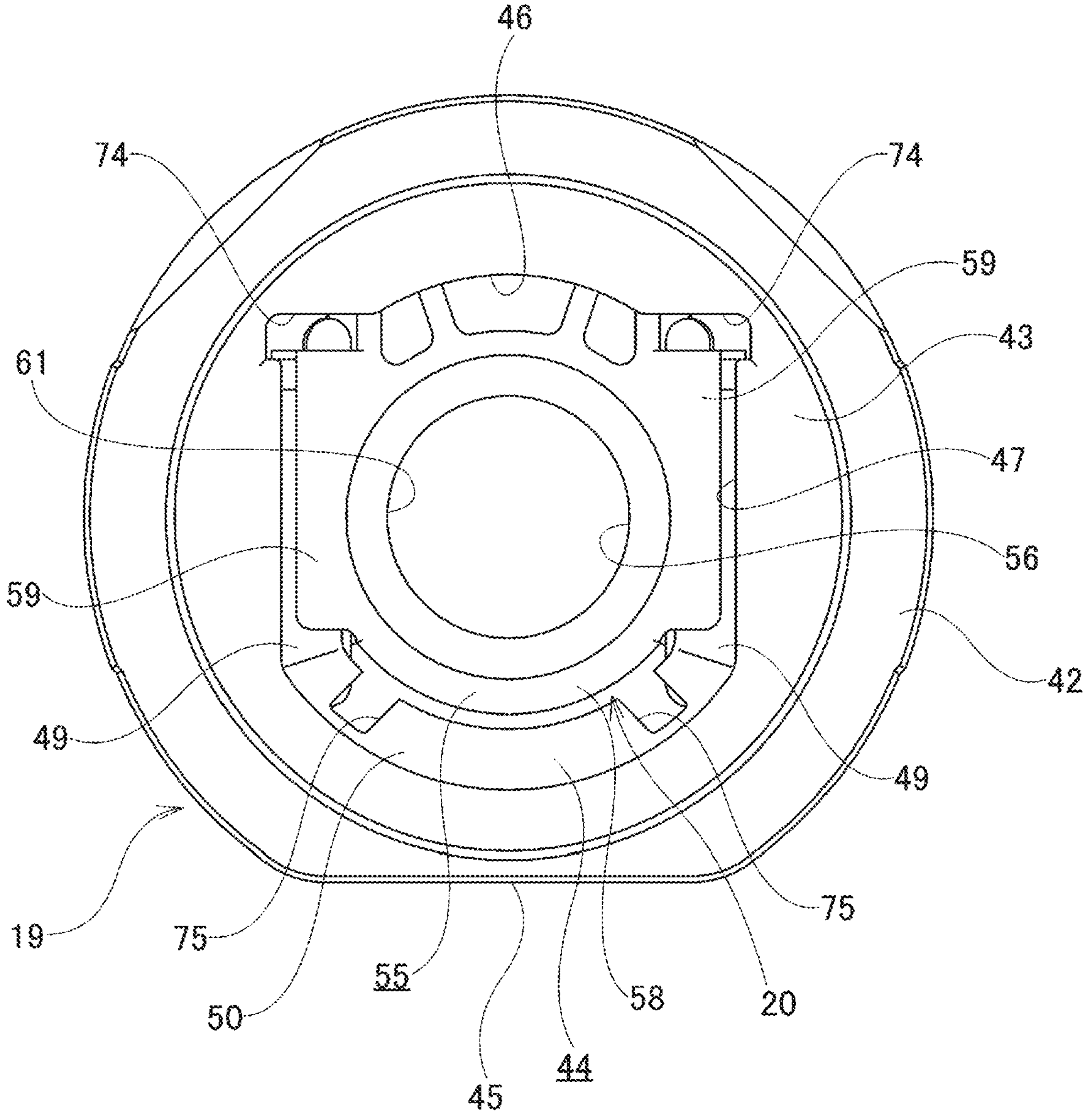
FIG. 16 shows a combination of the holder and the pad as viewed from the left side of FIG. 4.

Further, in this example, as shown in FIG. 16, the dimension of each of the base portion overhang portions 59 in the first direction is adjusted such that the first grease supply portion 74 provided in the holder 19 is not blocked by the two base portion overhang portions 59 in a state in which the holder 19 and the pad 20 are combined by inserting the pad base portion 55 between the two guide portions 49. That is, in the state in which the holder 19 and the pad 20 are combined with each other, the first grease supply portion 74 is located farther from the worm wheel 17 than the base portion overhang portion 59 in the first direction.

The flat plate portion 57 is integrally connected to an end portion of the base portion body 58 on the one side in the second direction, and has a circular outer circumferential shape when viewed from the one side in the second direction. The through hole 56 penetrates a radially central portion of the flat plate portion 57 in the second direction. Therefore, the flat plate portion 57 is formed in a circular ring flat plate shape centered on the central axis of the through hole 56. An outer diameter dimension of the flat plate portion 57 is larger than a width dimension of the base portion body 58 in the third direction. End portions on both sides of the flat plate portion 57 in the third direction protrude further toward both sides in the third direction than the base portion body 58. An end portion of the flat plate portion 57 on a side close to the worm wheel 17 in the first direction protrudes to a side close to the worm wheel 17 than the base portion body 58 in the first direction. An end portion of the base portion body 58 on a side far from the worm wheel 17 in the first direction protrudes farther from the worm wheel 17 than the flat plate portion 57 in the first direction.

In this example, the two pad elastic pressing plates 54 constituting the pad 20 are connected to a portion of the pad base portion 55 protruding from between the two guide portions 49 to the one side in the second direction. Specifically, the two pad elastic pressing plates 54 are implemented by end portions on both sides of the flat plate portion 57 in the third direction.

In this example, as shown in FIGS. 10, 11, FIG. 14B, and FIG. 15B to 15D, each of the two pad elastic pressing plates 54 includes at least one ridge 64*a*, 64*b* extending in the first direction on the side surface on the other side in the second direction. In a free state before the two pad elastic pressing plates 54 are elastically deformed, in other words, in a free state before the pad 20 is assembled to the protruding portion 44 of the holder 19, the height of the at least one ridge 64*a*, 64*b* in the second direction increases continuously or stepwise as a distance from the worm 18 in the third direction increases.

Figures 15A, 15B, 15C, 15D:
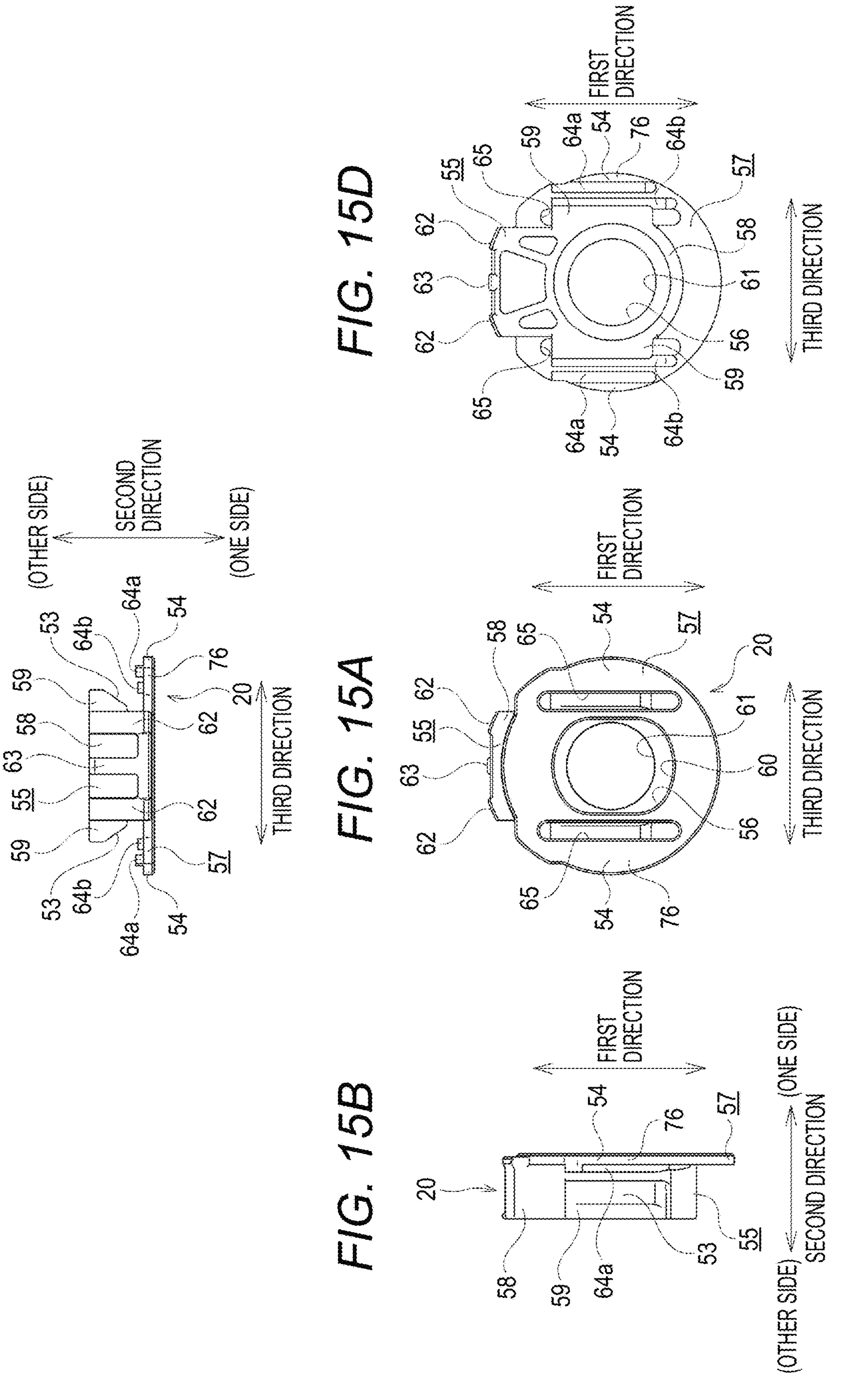
FIG. 15A is a view of the pad taken out and viewed from the right side of FIG. 4.
FIG. 15B is a view of the pad viewed from a left side of FIG. 15A.
FIG. 15C is a view of the pad viewed from an upper side of FIG. 15A.
FIG. 15D is a view of the pad viewed from a back side (left side of FIG. 4) of FIG. 15A.

In this example, as the at least one ridge 64*a*, 64*b*, two ridges 64*a* and 64*b* disposed apart from each other in the third direction are provided. As shown in FIG. 15A, in the free state, of the two ridges 64*a* and 64*b*, the height of the ridge 64*a* in the second direction on the side far from the worm 18 in the third direction is higher than the height of the ridge 64*b* in the second direction on the side close to the worm 18 in the third direction. In this example, in the free state, the cross-sectional shape of the tip end portion of each of the two ridges 64*a* and 64*b* is a linear shape orthogonal to the second direction. More specifically, in the free state, the tip end portion of each of the two ridges 64*a* and 64*b* is implemented by a flat surface orthogonal to the second direction.

The degree of making the height of the ridge 64*a* in the second direction on the side far from the worm 18 in the third direction higher than the height of the ridge 64*b* in the second direction on the side close to the worm 18 in the third direction is not particularly limited as long as the respective tip end portions of the ridges 64*a* and 64*b* can abut on the holder pressed surface 52 in a state in which the pad 20 is assembled to the protruding portion 44 of the holder 19, but in the worm reducer 14 incorporated in the electric power steering device 1, the degree can be, for example, 0.05 mm or more and 0.30 mm or less, preferably 0.10 mm or more and 0.15 mm or less.

In this example, each of the two pad elastic pressing plates 54 has a slit 65 penetrating in the second direction and extending in the first direction at a base end portion that is an end portion on a central side of the pad 20 in the third direction. In this example, a bending rigidity, of the base end portion of the pad elastic pressing plate 54, in the second direction of the portions adjacent to both sides of the slit 65 in a length direction is adjusted by appropriately regulating a width and length of the slit 65, a plate thickness of the pad elastic pressing plate 54, and the like. However, when the worm reducer of the aspect of the present disclosure is implemented, the slit may be omitted.

As shown in FIGS. 3 to 5 and FIGS. 7 to 10, the pad 20 is assembled to the protruding portion 44 of the holder 19 and externally fitted to the tip end portion of the worm 18.

Specifically, the two pad inclined surfaces 53 are in surface contact with the two holder inclined surfaces 41 in a state in which a portion of the pad base portion 55 of the pad 20 on a side close to the worm wheel 17 in the first direction is disposed between the two guide portions 49 constituting the protruding portion 44 of the holder 19. The tip end portions of the ridges 64*a* and 64*b* of the two pad elastic pressing plates 54 elastically press the two holder pressed surfaces 52 toward the other side in the second direction. Accordingly, the preload is applied to the contact portions between the two holder inclined surfaces 41 and the two pad inclined surfaces 53.

An inclination angle α of each of the two pad elastic pressing plates 54 with respect to the virtual plane orthogonal to the second direction in a state in which the pad 20 is assembled to the protruding portion of the holder 19 is not particularly limited, but can be, for example, 0 degrees or more and 15 degrees or less.

Further, the small-diameter cylindrical surface portion 30 of the tip end portion of the worm 18 is internally fitted into the circular hole portion 61 of the through hole 56 of the pad 20 so as to be relatively rotatable without rattling in the radial direction.

In this state, a gap in the first direction is present between a side surface of the pad base portion 55 of the pad 20 on a side close to the worm wheel 17 in the first direction and a side surface of the connection portion 50 constituting the protruding portion 44 of the holder 19 on a side far from the worm wheel 17 in the first direction. In this example, the pad 20 can be displaced in the first direction with respect to the holder 19 based on the gap in the first direction.

Figure 10:
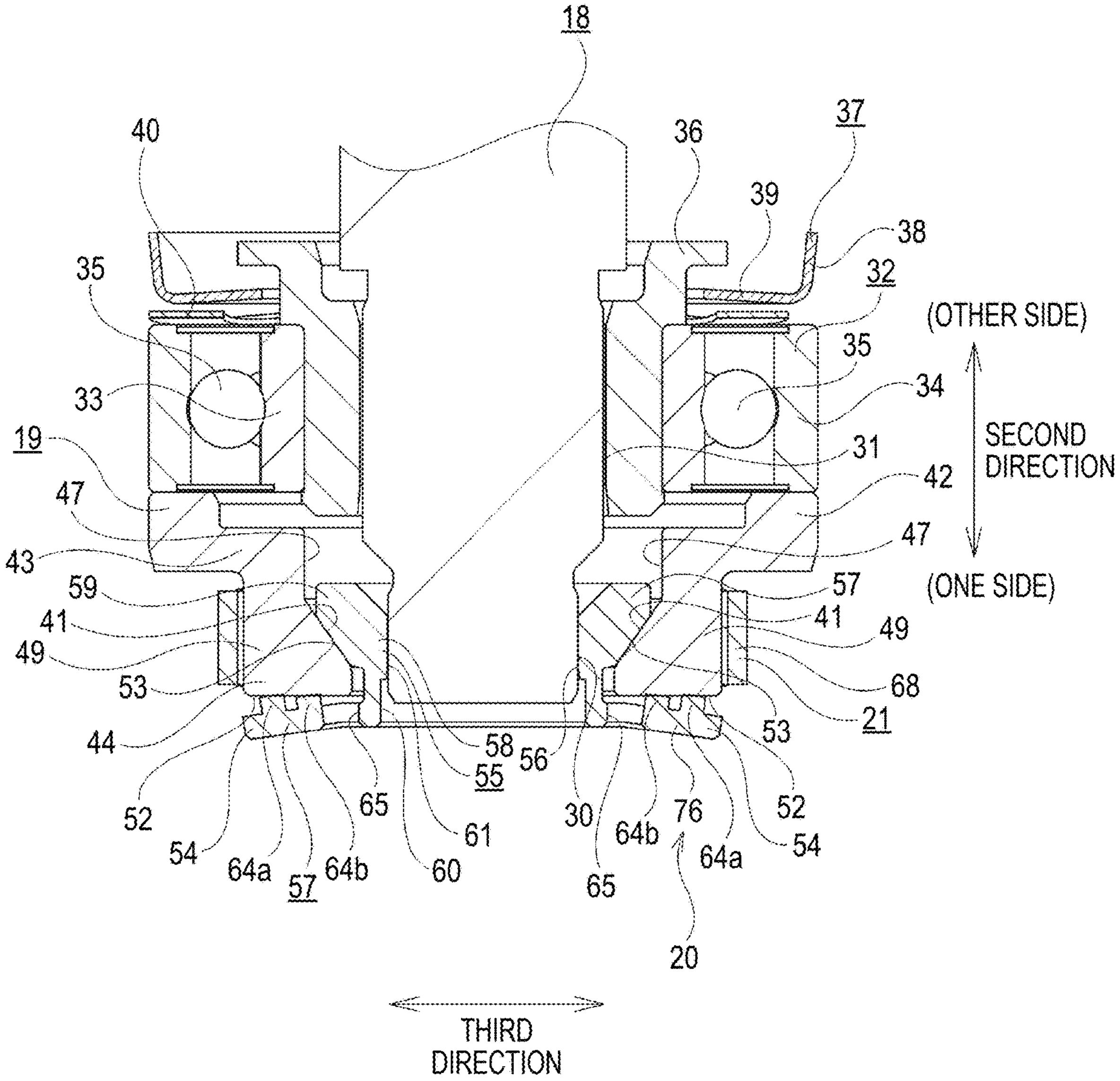
FIG. 10 is a cross-sectional view taken along a line B-B of FIG. 7.

In this state, as shown in FIGS. 10 and 11, a gap in the third direction is present between the pad base portion 55 of the pad 20 and, of the inner side surfaces 51 of the two guide portions 49, each of the portions located on the one side in the second direction with respect to the two holder inclined surfaces 41 and the portions located on the other side in the second direction with respect to the two holder inclined surfaces 41. In this example, the pad 20 can be displaced in the third direction with respect to the holder 19 based on the gap in the third direction.

Figure 6:
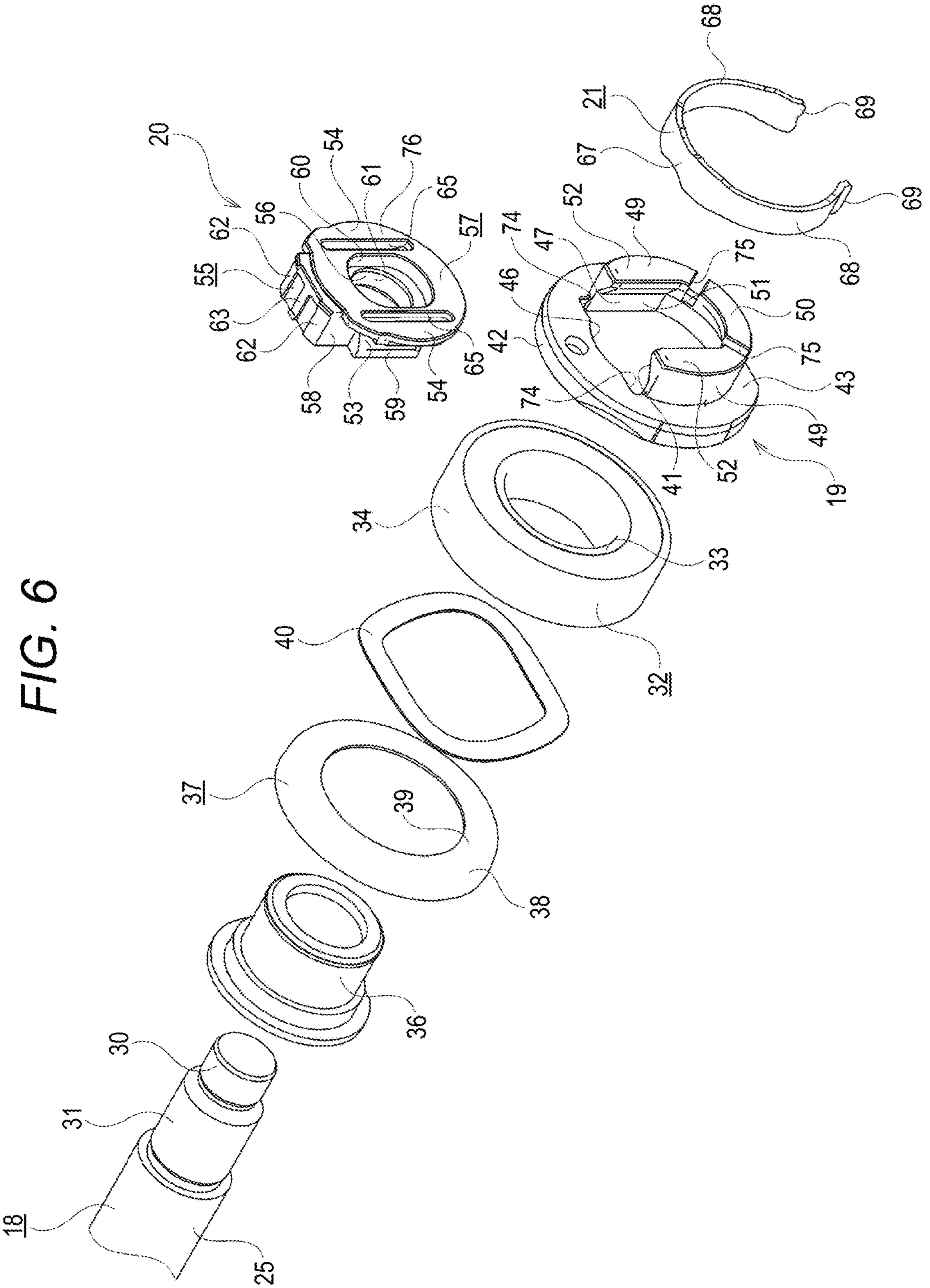
FIG. 6 is an exploded perspective view showing the tip end portion of the worm and the members disposed around the tip end portion.
Figure 7:
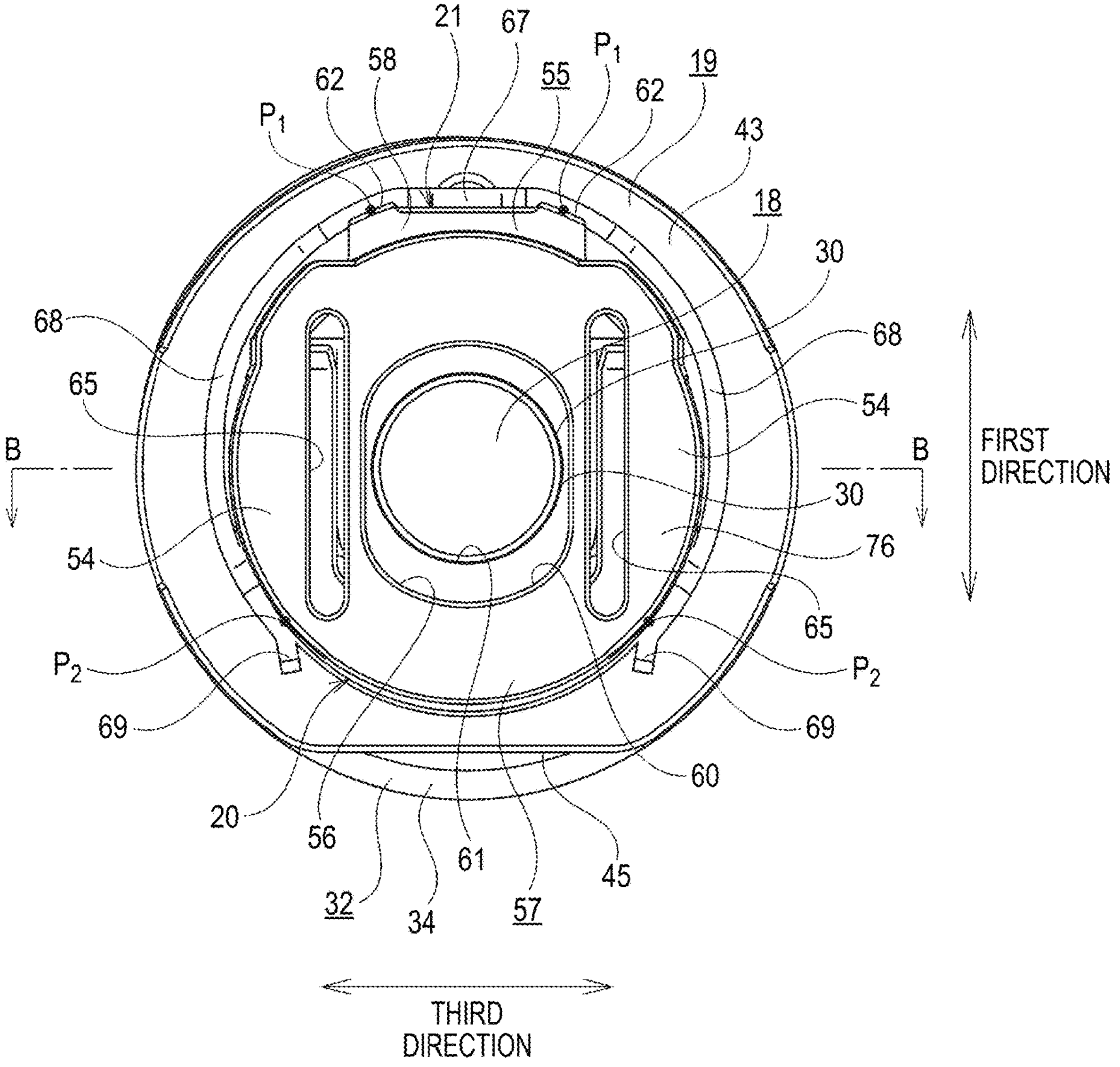
FIG. 7 is a right side view of FIG. 4.
Figure 8:
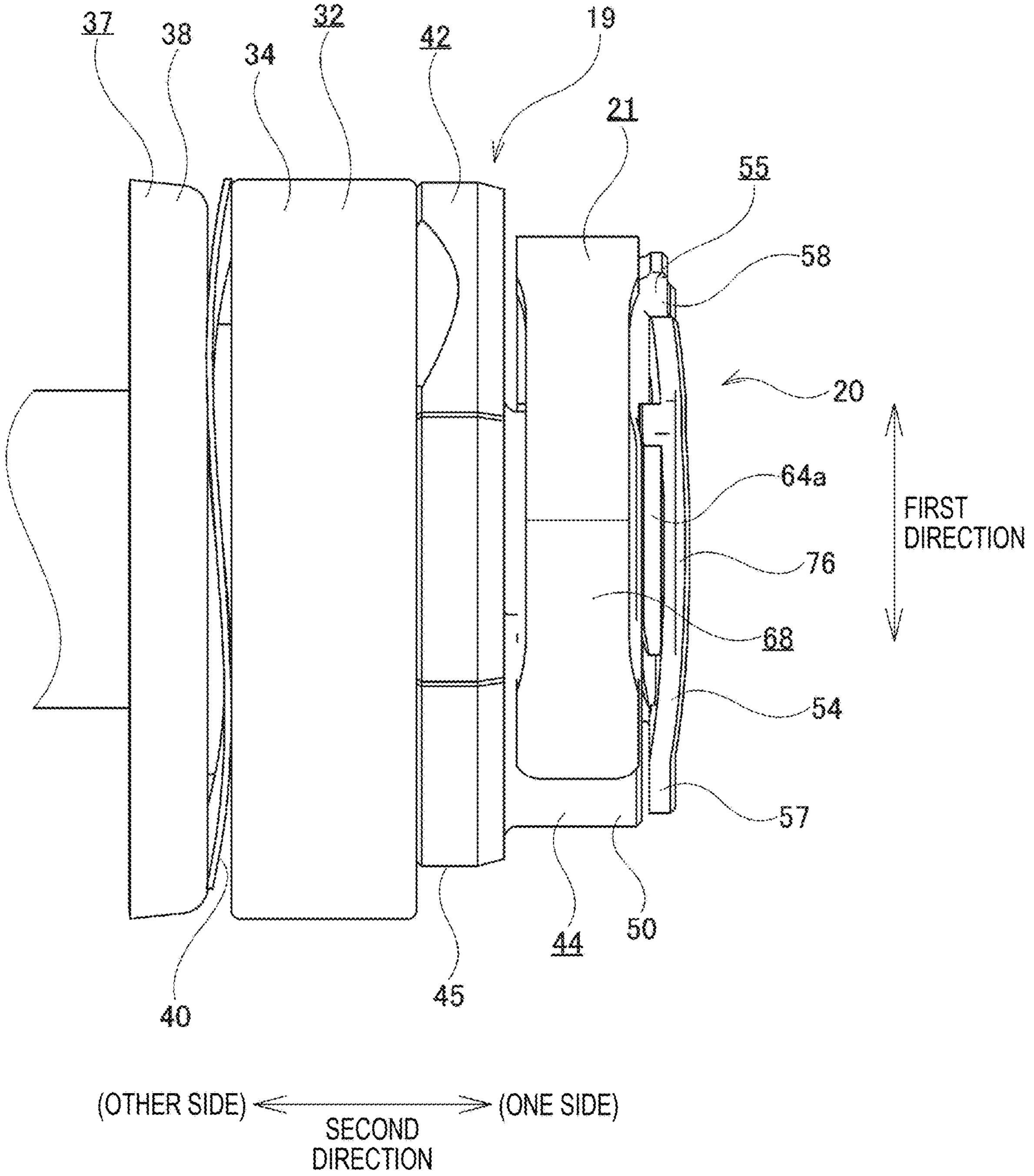
FIG. 8 is a left side view of FIG. 7.
Figure 9:
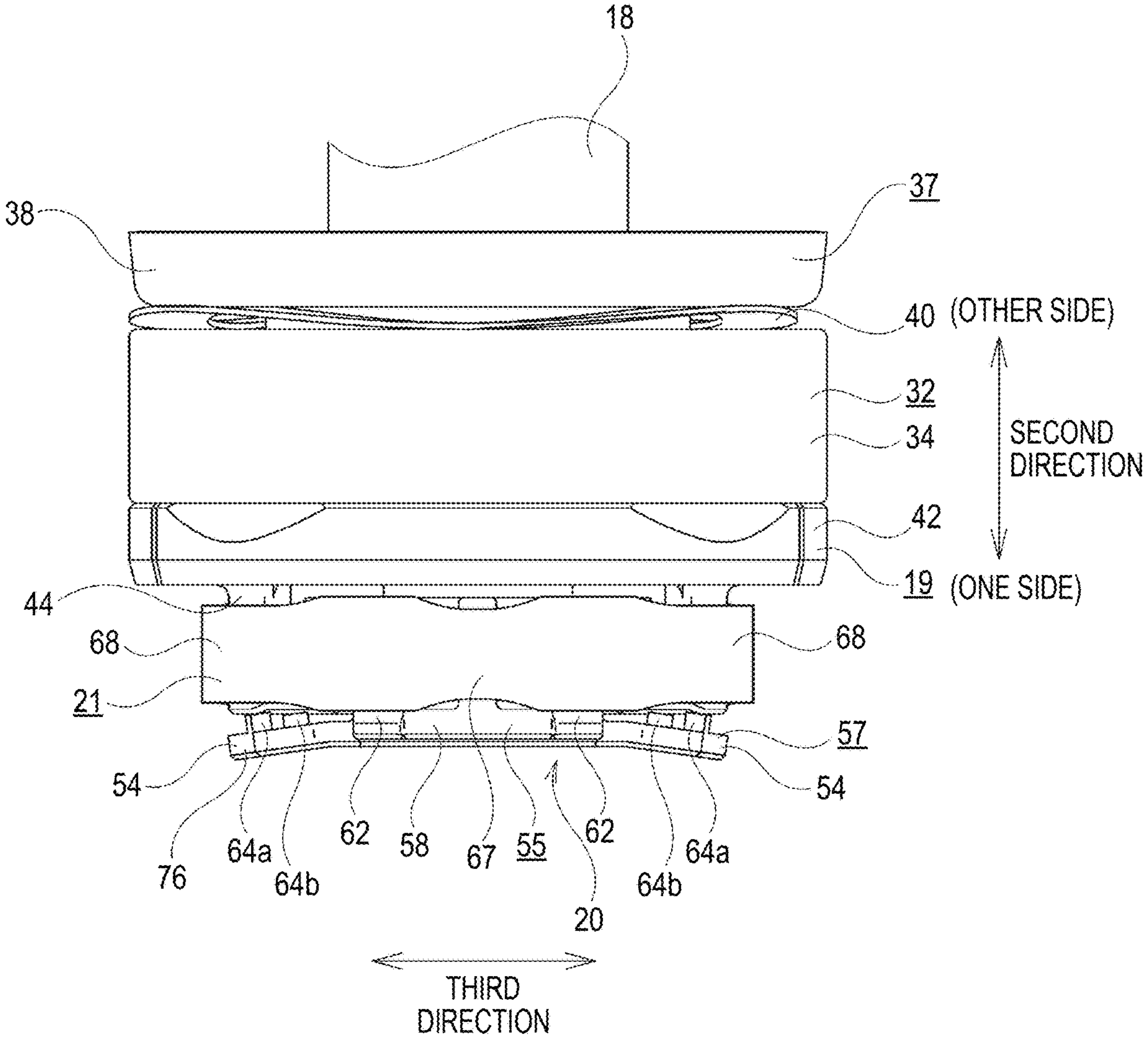
FIG. 9 is a top view of FIG. 7.
Figure 17:
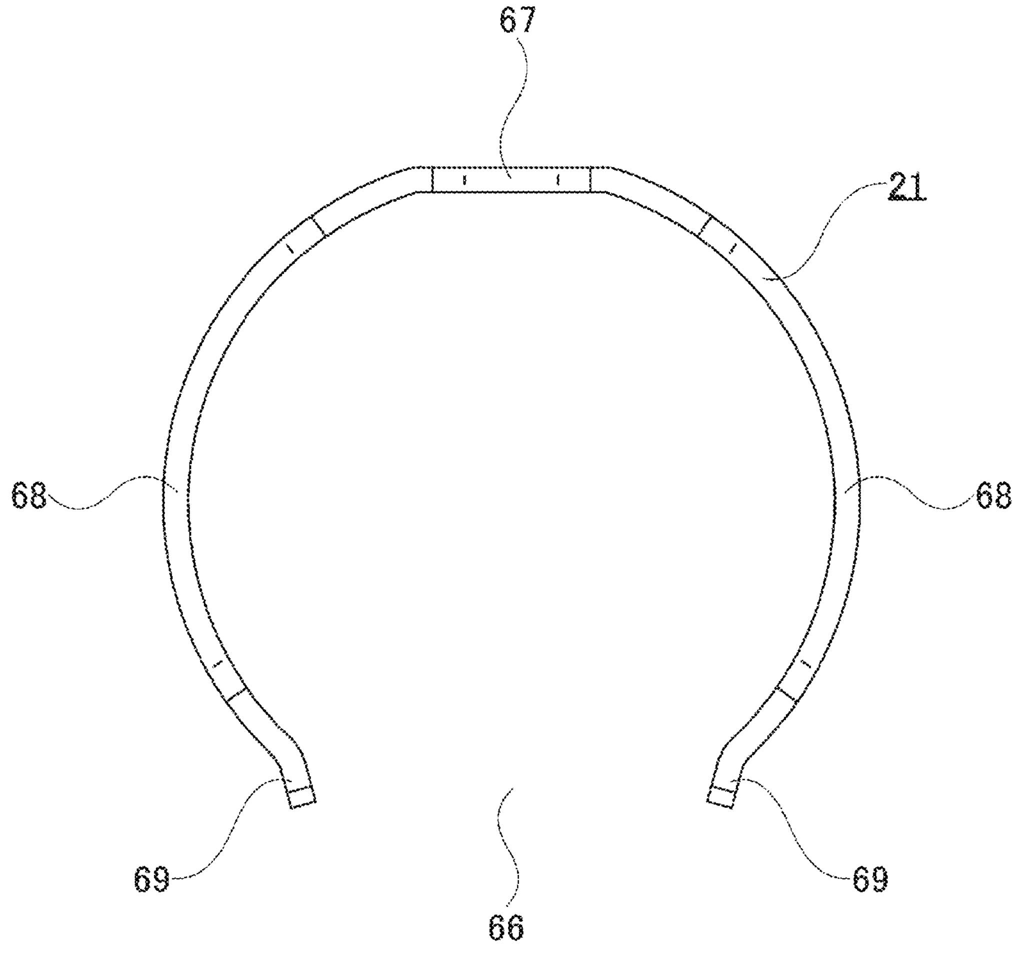
FIG. 17 is a view of an elastic member taken out and viewed from the right side of FIG. 4.

In this example, the elastic member 21 is implemented by a plate spring. More specifically, in this example, as shown in FIGS. 6 and 17, the elastic member 21 is implemented by a cut-out cylindrical plate spring having a discontinuous portion 66 at one position in the circumferential direction. Specifically, the elastic member 21 includes a base portion 67 located on a side far from the worm 18 in the first direction, and the two arm portions 68 extending in the circumferential direction from end portions on both sides of the base portion 67 in the circumferential direction.

In this example, the base portion 67 is implemented by a flat plate orthogonal to the first direction.

Each of the two arm portions 68 is formed in a partially cylindrical shape. Each of the two arm portions 68 has a bent portion 69 bent radially outward from the tip end portion.

However, when the worm reducer of the aspect of the present disclosure is implemented, the elastic member can have any configuration as long as the pad can be elastically biased toward the worm wheel 17 side in the first direction. For example, when the elastic member is implemented by a plate spring, the elastic member may have a shape other than a partially cylindrical shape. Further, the elastic member may be implemented by a torsion coil spring.

The elastic member 21 is assembled to the holder 19 so as to be externally fitted to the pad base portion 55 of the pad 20 and the protruding portion 44 of the holder 19. In this example, in a state in which the pad base portion 55 of the pad 20 and the protruding portion 44 of the holder 19 are inserted into a radially inner side of the elastic member 21, the base portion 67 of the elastic member 21 abuts on the pedestal surface portion 63 of the pad 20, inner circumferential surfaces of base end side portions of the two arm portions 68 are elastically pressed against the two pressed portions 62 provided in the pad base portion 55, and inner circumferential surfaces of tip end side portions of the two arm portions 68 are elastically pressed against the side surface of the connection portion 50 constituting the protruding portion 44 of the holder 19 on the side close to the worm wheel 17 in the first direction. Accordingly, the tip end portion of the worm 18 is elastically biased toward the worm wheel 17 side, that is, toward the side close to the worm wheel 17 in the first direction via the pad 20. Accordingly, the backlash at the meshing portion between the wheel teeth 24 and the worm teeth 25 is suppressed.

The contact portion P1 between the elastic member 21 and the pad base portion 55 (pressed portion 62) and the contact portion P2 between the elastic member 21 and the protruding portion 44 are lubricated with grease.

During assembly of the worm reducer 14 of this example, first, the pad base portion 55 of the pad 20 is assembled to the protruding portion 44 of the holder 19, and the elastic member 21 is assembled to the holder 19 such that the pad base portion 55 and the protruding portion 44 are externally fitted, thereby obtaining an assembly of the holder 19, the pad 20, and the elastic member 21. Next, the assembly is disposed at a predetermined position inside the worm accommodating portion 23. Further, the support bearing 32, the bush 36, the wave washer 40, and the retainer 37 are disposed at predetermined positions inside the worm accommodating portion 23.

Next, as shown in FIG. 18, grease G is filled inside the worm accommodating portion 23 from a base end side (the other side in the second direction) of the worm accommodating portion 23. When the grease G is filled in a radially inner side of the holder 19, a part of the grease G is supplied to the contact portion P1 between the elastic member 21 and the pad base portion 55 through the first grease supply portion 74, and is supplied to the contact portion P2 between the elastic member 21 and the protruding portion 44 through the second grease supply portion 75.

Thereafter, the worm 18 is inserted into the inside of the worm accommodating portion 23 from the base end side of the worm accommodating portion 23, the small-diameter cylindrical surface portion 30 is internally fitted to the circular hole portion 61 of the pad 20, the large-diameter cylindrical surface portion 31 is internally fitted to the bush 36, and the worm teeth 25 are meshed with the wheel teeth 24 of the worm wheel 17 rotatably supported inside the wheel accommodating portion 22.

The procedure of assembling the worm reducer 14 can be appropriately replaced or simultaneously performed as long as no contradiction occurs.

According to the worm reducer 14 of the present example, the following operational effects can be achieved.

The two pad inclined surfaces 53 constituting the pad 20 are in surface contact with the two holder inclined surfaces 41 constituting the holder 19. Further, the tip end portions of the respective ridges 64_a_ and 64_b_ of the two pad elastic pressing plates 54 constituting the pad 20 elastically press the two holder pressed surfaces 52 constituting the holder 19 toward the other side in the second direction. Accordingly, the preload is applied to the contact portions between the two holder inclined surfaces 41 and the two pad inclined surfaces 53. Therefore, the displacement of the pad 20 in the third direction with respect to the holder 19 is regulated based on the contact between the two holder inclined surfaces 41 and the two pad inclined surfaces 53, thereby preventing the pad 20 from rattling without resistance in the third direction with respect to the holder 19.

Specifically, in this example, as shown in FIGS. 10 and 11, the tip end portions of the ridges 64_a_ and 64_b_ of the pad elastic pressing plate 54 elastically press the holder pressed surface 52 toward the other side in the second direction, so that an elastic force (pre-pressure) Fp directed toward the one side in the second direction acts on the holder inclined surface 41 from the pad inclined surface 53. Then, the elastic force Fp is converted into an elastic force (pre-pressure) Fx acting on the holder inclined surface 41 from the pad inclined surface 53 and directed outward in the third direction. In the structure of the present example, based on the elastic force Fx, the pad 20 can be prevented from rattling without resistance in the third direction with respect to the holder 19.

Therefore, as a rotation direction of the worm 18 changes, even when the direction of a component in the third direction, of a reaction force applied from the wheel teeth 24 to the worm teeth 25, changes, the tip end portion of the worm 18 is less likely to be displaced in the third direction. As a result, it is possible to prevent abnormal noise such as tooth rattling noise from occurring at the meshing portion between the wheel teeth 24 and the worm teeth 25, and to prevent abnormal noise such as collision noise from occurring between the pad 20 and the holder 19.

When the worm reducer according to the aspect of the present disclosure is implemented, the bending rigidity in the second direction of the portions adjacent to both sides in the length direction of the slit 65, of the base end portion of the pad elastic pressing plate 54, can be changed by changing the width and length of the slit 65, the plate thickness of the pad elastic pressing plate 54, the height of the ridges 64_a_ and 64_b_ in the second direction, and the like. Accordingly, it is possible to change the magnitude of the force with which the tip end portions of the ridges 64_a_ and 64_b_ of the pad elastic pressing plate 54 elastically press the holder pressed surfaces 52 toward the other side in the second direction. Accordingly, the magnitude of the elastic force Fp can be freely changed.

The pad elastic pressing plate 54 locally presses the holder pressed surface 52 by the tip end portions of the ridges 64_a_ and 64_b_. Therefore, the pressing force can be stabilized as compared with a case where the pad elastic pressing plate presses the holder pressed surface in a wide range.

A relational expression of "$Fx=Fp/\tan\varphi$" is established between the elastic force Fx and the elastic force Fp. In this example, since the inclination angle $\varphi=30°$, $Fx=Fp/\tan 30°=1.7Fp$. That is, the elastic force Fx becomes larger than the elastic force Fp. When the worm reducer according to the aspect of the present disclosure is implemented, the magnitude of the elastic force Fx can be freely changed by changing not only the magnitude of Fp but also the magnitude of the inclination angle φ. For example, if $\varphi=45°$, $Fx=Fp$, if $45°<\varphi<90°$, $Fx<Fp$, and if $0°<\varphi<45°$, $Fx>Fp$. Further, the magnitude of the elastic force Fx can be adjusted by changing the inclination angle φ without changing the material (elastic force based on the material) of the pad 20. Therefore, the magnitude of the elastic force Fx can be easily adjusted in a design stage.

When the worm reducer of the aspect of the present disclosure is implemented, the inclination angle of the holder inclined surface 41 with respect to the second direction and the inclination angle of the pad inclined surface 53 with respect to the second direction do not need to be exactly the same, and may be different within a range of manufacturing errors. Further, the inclination angle of the holder inclined surface 41 with respect to the second direction can be slightly smaller (for example, about) 0.5° than the inclination angle of the pad inclined surface 53 with respect to the second direction. In this way, in the contact portion between the holder inclined surface 41 and the pad inclined surface 53, the tip end portion (the end portion on the right side in the third direction in FIG. 11, the end portion on the other side in the second direction in FIG. 11) of the pad inclined surface 53 comes into particularly strong surface contact with the holder inclined surface 41. As a result, the posture of the pad 20 with respect to the holder 19 is stabilized.

When viewed from the first direction, as shown in FIGS. 10 and 11, a case where the pad 20 is displaced from a neutral state, which is a state in which the central axis of the holder 19 and a central axis of the pad 20 coincide with each other, to any one side in the third direction with respect to the holder 19, for example, to a right side in FIGS. 10 and 11 will be considered. In this case, along with sliding displacement of the right pad inclined surface 53 along the right holder inclined surface 41, the pad base portion 55 of the pad 20 is displaced toward the other side in the second direction, and at the same time, the right pad elastic pressing plate 54 is elastically deformed so as to tile toward the one side in the second direction. The elastic forces Fp and Fx increase as the elastic pressing force acting on the right holder pressed surface 52 from the right pad elastic pressing plate 54 increases by an amount corresponding to the amount of elastic deformation. As a result, the pad 20 is much less likely to be displaced toward the right side. The same applies to a case where the pad 20 is displaced from the neutral state to a left side in FIGS. 10 and 11 with respect to the holder 19.

An inner circumferential surface of a central portion of the elastic member 21 in the circumferential direction is elastically pressed against the two pressed portions 62 provided at the end portions on both sides of the base portion body 58 in the third direction constituting the pad 20. Therefore, a force having not only a component in a direction approaching the worm wheel 17 in the first direction but also components in opposite directions in the third direction is applied to the two pressed portions 62. From this aspect as well, the tip end portion of the worm 18 can be prevented from being displaced in the third direction when the rotation direction of the worm 18 changes.

Further, in this example, the holder 19 includes the first grease supply portion 74 for supplying grease to the contact portion P1 in the vicinity of the contact portion P1 between the pad base portion 55 constituting the pad 20 and the elastic member 21, and the second grease supply portion 75 for supplying grease to the contact portion P2 in the vicinity of the contact portion P2 between the elastic member 21 and the protruding portion 44.

Therefore, during the assembly of the worm reducer 14 of the present example, as shown in FIG. 18, even when the grease G is filled inside the worm accommodating portion 23 from the base end side (the other side in the second direction) after the holder 19, the pad 20, and the elastic member 21 are assembled inside the worm accommodating portion 23, a sufficient amount of the grease G can be supplied to the contact portion P1 between the elastic member 21 and the pad base portion 55 (the pressed portion 62) and the contact portion P2 between the elastic member 21 and the protruding portion 44.

That is, the grease G filled inside the worm accommodating portion 23 from the base end side can be supplied to the contact portion P1 between the elastic member 21 and the pad base portion 55 through the first grease supply portion 74, and can be supplied to the contact portion P2 between the elastic member 21 and the protruding portion 44 through the second grease supply portion 75. Accordingly, a lubrication state of the contact portion P1 between the elastic member 21 and the pad base portion 55 and the contact portion P2 between the elastic member 21 and the protruding portion 44 can be improved, and the occurrence of wear at these contact portions P1 and P2 can be prevented.

During the assembly of the worm reducer, a method is contemplated, in which the grease is applied to the contact portion between the elastic member and the pad base portion and the contact portion between the elastic member and the protruding portion before the holder, the pad, and the elastic member are disposed inside the worm accommodating portion, and then the holder, the pad, and the elastic member are disposed inside the worm accommodating portion. However, in this case, since the grease having adhesiveness is applied to a surface of the assembly formed by combining the holder, the pad, and the elastic member in a state before the assembly is assembled to the inner side of the worm accommodating portion, there is a possibility that the handleability of the assembly is deteriorated or foreign substances such as dust are likely to adhere to the assembly, which makes management troublesome.

On the other hand, since the worm reducer 14 of the present example includes the first grease supply portion 74 and the second grease supply portion 75, even when the grease is filled inside the worm accommodating portion 23 after the holder 19, the pad 20, and the elastic member 21 are assembled inside the worm accommodating portion 23, a sufficient amount of the grease G can be supplied to the contact portion P1 between the elastic member 21 and the pad base portion 55 and the contact portion P2 between the elastic member 21 and the protruding portion 44. That is, during the assembly of the worm reducer 14, it is not necessary to apply the grease to the contact portions P1 and P2 before the holder 19, the pad 20, and the elastic member 21 are disposed inside the worm accommodating portion. Therefore, it is possible to prevent the deterioration of the handleability of the assembly of the holder 19, the pad 20, and the elastic member 21 and the troublesome management, and the workability of the assembly work of the worm reducer 14 can be improved.

In this example, the first grease supply portion 74 on one side (the left side in FIG. 13A and the right side in FIG. 13C) in the third direction of the two first grease supply portions 74 and the second grease supply portion 75 on the other side (the right side in FIG. 13A and the left side in FIG. 13C) in the third direction of the two second grease supply portions 75 are located on opposite sides (on diagonal lines) in the radial direction with respect to the central axis of the holder 19. The first grease supply portion 74 on the other side in the third direction of the two first grease supply portions 74 and the second grease supply portion 75 on the one side in the third direction of the two second grease supply portions 75 are located on opposite sides (on diagonal lines) in the radial direction with respect to the central axis of the holder 19. Therefore, according to the worm reducer 14 of the present example, as compared with a structure in which the grease supply portion for supplying the grease to the contact portion between the holder and the elastic member is provided only in one of the side portion close to the worm wheel and the side portion far from the worm wheel in the first direction, the flow of the grease can be stabilized when the grease is supplied from the other side portion to the one side portion of the holder 19 in the second direction through the first grease supply portion 74 and the second grease supply portion 75. Therefore, the productivity of the worm reducer 14 can be improved, and mass production can be easily achieved.

When the worm reducer of the aspect of the present disclosure is implemented, formation positions of the first grease supply portion and the second grease supply portion are not limited to the configuration of the present example, and can be appropriately changed as long as a sufficient amount of the grease G can be supplied to the contact portion between the elastic member and the pad base portion and the contact portion between the elastic member and the protruding portion. For example, the second grease supply portion may be formed to penetrate the side plate portion constituting the holder in the second direction.

In this example, in the free state before the two pad elastic pressing plates 54 are elastically deformed, the height of at least one ridge 64*a*, 64*b* in the second direction provided on each of the two pad elastic pressing plates 54 increases continuously or stepwise as a distance from the worm 18 in the third direction increases. Specifically, of the two ridges 64*a* and 64*b*, the height of the ridge 64*a* in the second direction on the side far from the worm 18 in the third direction is higher than the height of the ridge 64*b* in the second direction on the side close to the worm 18 in the third direction. Therefore, the displacement of the tip end portion of the worm 18 in the third direction when the rotation direction of the worm 18 changes can be stably prevented.

By assembling the pad 20 to the protruding portion 44 of the holder 19, when the tip end portions of the ridges 64*a* and 64*b* of the two pad elastic pressing plates 54 elastically abut on the two holder pressed surfaces 52 of the holder 19, each of the two pad elastic pressing plates 54 is elastically deformed so as to tile in a direction toward the one side in the second direction as a distance from the worm 18 in the third direction increases, centered on the base end portions thereof.

When the heights of the two ridges provided on each of the two pad elastic pressing plates in the second direction are the same as each other, in a state in which the pad is assembled to the protruding portion of the holder, there is a possibility that only the tip end portion of the ridge on the side close to the worm in the third direction abuts on the holder pressed surface, and the tip end portion of the ridge on the side far from the worm in the third direction does not abut on the holder pressed surface. Therefore, there is a possibility that a manner of the elastic deformation of the pad elastic pressing plate cannot be stabilized, or a surface pressure of an abutting portion between the tip end portion of the ridge on the side close to the worm in the third direction and the holder pressed surface becomes excessive, and wear occurs in the abutting portion. As a result, there is a possibility that the elastic forces Fx and Fp cannot be stabilized based on the fact that the tip end portion of the ridge elastically presses the holder pressed surface toward the other side in the second direction.

On the other hand, in this example, the height in the second direction of the ridge 64*a* on the side far from the worm 18 in the third direction is higher than the height in the second direction of the ridge 64*b* on the side close to the worm 18 in the third direction. Therefore, in a state in which the pad 20 is assembled to the protruding portion 44 of the holder 19, the tip end portions of the two ridges 64*a* and 64*b* can reliably abut on the holder pressed surface 52. Therefore, the manner of the elastic deformation of the pad elastic pressing plate 54 can be stabilized, the surface pressure of the abutting portions between the tip end portions of the ridges 64*a* and 64*b* and the holder pressed surface 52 can be prevented from becoming excessive, and the occurrence of wear at the abutting portions can be prevented. As a result, the elastic forces Fx and Fp can be stabilized based on the fact that the tip end portions of the ridges 64*a* and 64*b* elastically press the holder pressed surface 52 toward the other side in the second direction, and the displacement of the tip end portion of the worm 18 in the third direction when the rotation direction of the worm 18 changes can be stably prevented.

Further, according to the worm reducer 14 of the present example, it is possible to hold the grease for lubricating the abutting portions between the tip end portions of the ridges 64*a* and 64*b* and the holder pressed surface 52 between the two ridges 64*a* and 64*b* provided on each of the two pad elastic pressing plates 54. Therefore, the lubrication state of the abutting portions between the tip end portions of the ridges 64*a* and 64*b* and the holder pressed surface 52 can be favorably maintained for a long period of time. From this aspect as well, it is possible to prevent the occurrence of wear at the abutting portions between the tip end portions of the ridges 64*a* and 64*b* and the holder pressed surface 52.

In this example, the number of ridges 64*a* and 64*b* provided on each of the two pad elastic pressing plates 54 is two, but when the worm reducer of the aspect of the present disclosure is implemented, the number of ridges provided on each of the two pad elastic pressing plates may be three or more, or may be one. When the number of ridges provided on each of the two pad elastic pressing plates is one, the tip end portion of the ridge is implemented by an inclined surface inclined in a direction toward the other side in the second direction as the distance from the worm in the third direction increases. Accordingly, a contact area between the tip end portion of the ridge and the holder pressed surface can be increased, thereby preventing the elastic deformation of the pad elastic pressing plate from becoming unstable and preventing the tip end portion of the ridge from being worn.

Second Example

A second example of the embodiment of the present disclosure will be described with reference to FIG. 19A to FIG. 20C. A worm reducer of the present example is different from the worm reducer 14 of the first example in the configuration of an elastic member 21*a*. Since the configuration and operation effects of other portions are similar to those of the worm reducer 14 of the first example, the description thereof will be omitted.

As shown in FIG. 19A to 19D, the elastic member 21*a* is formed of a cut-out cylindrical (substantially C-shaped) plate spring having the discontinuous portion 66 at one position in a circumferential direction. In this example, the elastic member 21*a* includes a base portion 67*a* located on a side far from the worm 18 in the first direction, and two arm portions 68*a* extending in the circumferential direction from end portions on both sides of the base portion 67*a* in the circumferential direction.

In this example, the base portion 67*a* is implemented by a flat plate orthogonal to the first direction. The base portion 67*a* has a constricted portion 70 in an intermediate portion in the third direction, a width dimension of which in the second direction is smaller than a width dimension of both side portions in the third direction. However, the constricted portion 70 may be omitted.

Each of the two arm portions 68*a* is formed in a partially cylindrical shape. In this example, each of the two arm portions 68*a* includes a base-side wide portion 71, a narrow portion 72, and a tip-side wide portion 73 in order from a side close to the base portion 67*a* in the circumferential direction. In this example, a width dimension W71 of the base-side wide portion 71 in the second direction and a width dimension W73 of the tip-side wide portion 73 in the second direction are the same, and a width dimension W72 of the narrow portion 72 in the second direction is smaller than the width dimension W71 of the base-side wide portion 71 in the second direction and the width dimension W73 of the tip-side wide portion 73 in the second direction (W72<W71=W73).

In this example, each of the two arm portions 68*a* has a bent portion 69 bent outward in the radial direction from the tip end portion of the tip-side wide portion 73. A width dimension of the bent portion 69 in the second direction is the same as the width dimension W73 of the tip-side wide portion 73 in the second direction. However, the bent portion 69 may be omitted.

The elasticity of the elastic member 21*a* can be adjusted by adjusting a width dimension W68 of each narrow portion 72 of the two arm portions 68*a* in the second direction. That is, in the worm reducer of the present example, by adjusting the width dimension W72 of the narrow portion 72 in the second direction, it is possible to appropriately adjust the force with which the elastic member 21*a* elastically biases a tip end portion of the worm 18 toward the worm wheel 17 side via the pad 20. As a result, it is possible to suppress the occurrence of backlash at a meshing portion between the wheel teeth 24 and the worm teeth 25, suppress the occurrence of abnormal noise, and suppress an unnecessary increase in friction at the meshing portion.

Further, according to this example, the handleability of the elastic member 21*a* can be improved. The reason will be described with reference to FIG. 21A to FIG. 22C in addition to FIG. 19A to FIG. 20C.

FIG. 21A to FIG. 22C show a comparative example with respect to the second example. In the comparative example, each of the two arm portions 68*z* constituting an elastic member 21*z* includes only the base-side wide portion 71 and a narrow portion 72*z* in order from the side close to the base portion 67*a* in the circumferential direction, and does not include the tip-side wide portion 73. The elasticity of the elastic member 21*z* of the comparative example can also be adjusted by adjusting a width dimension of the narrow portion 72*z* in the second direction.

Figure 22C:
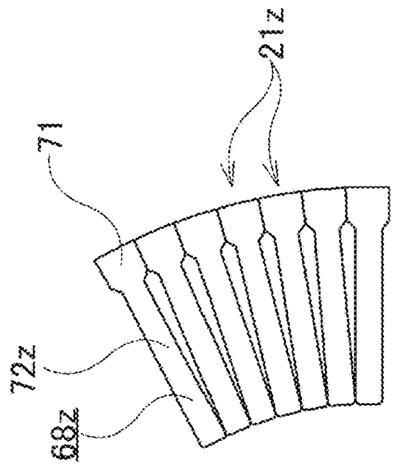
FIGS. 22A to 22C show views similar to FIGS. 20A to 20C according to the comparative example of the second example.
Figure 22B:
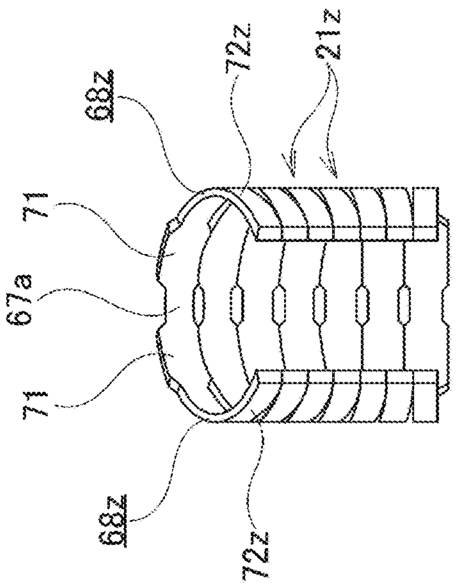
Figure 22A:
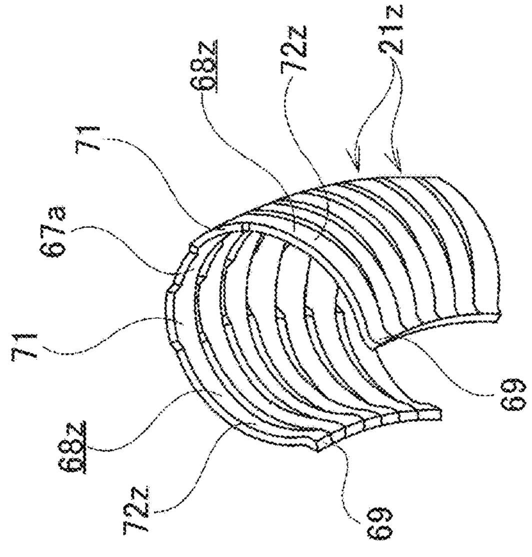
Figure 23:
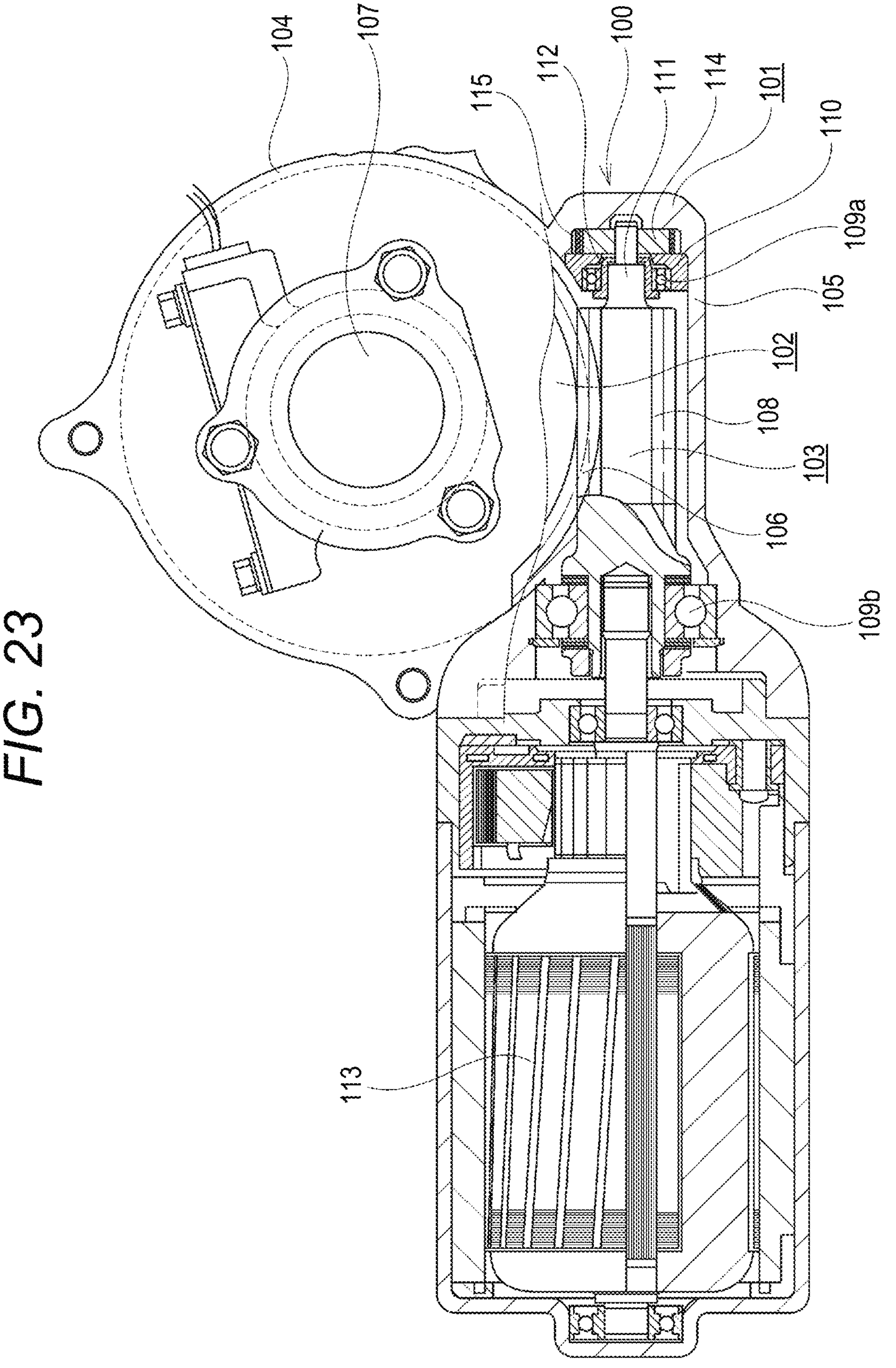
FIG. 23 is a cross-sectional view showing an example of a structure of a worm reducer in the related art.

In the elastic member 21*z* of the comparative example, the width dimension of the narrow portion 72*z* in the second direction is smaller than the width dimension of the base-side wide portion 71 in the second direction. Therefore, when the plurality of elastic members 21*z* are stacked in the axial direction, as shown in FIGS. 22A to 22C, the elastic members 21*z* are inclined toward a discontinuous portion 66 side, which makes handleability troublesome.

Figure 20C:
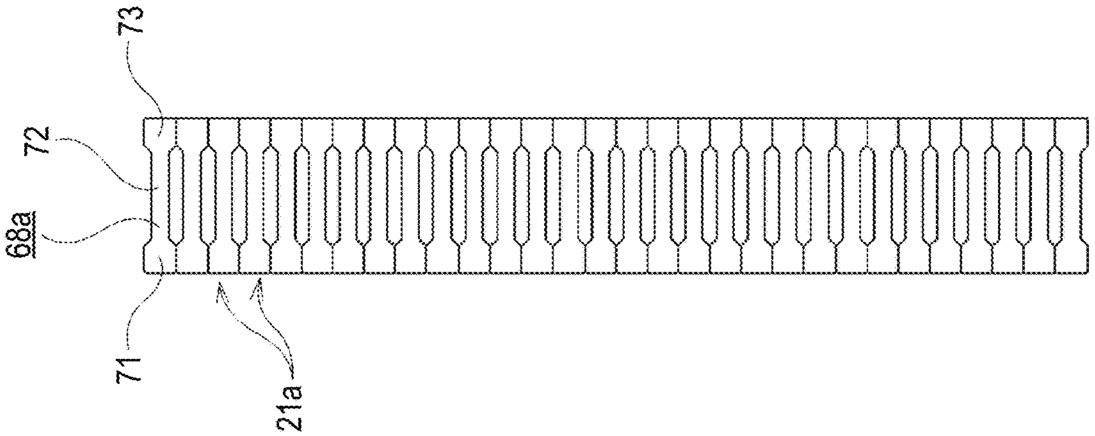
FIGS. 20A to 20C are views showing a state in which the elastic members are stacked, where
Figure 20B:
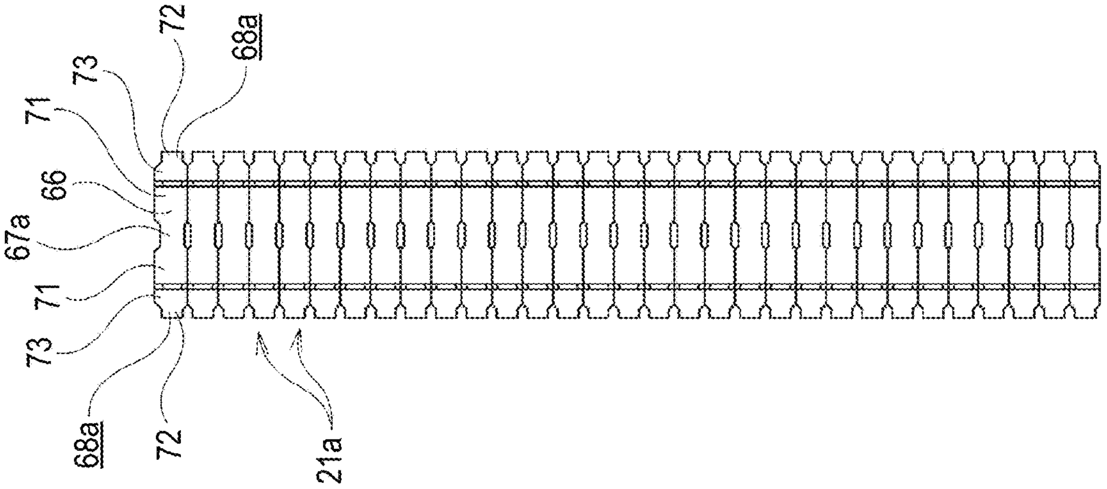
Figure 20A:
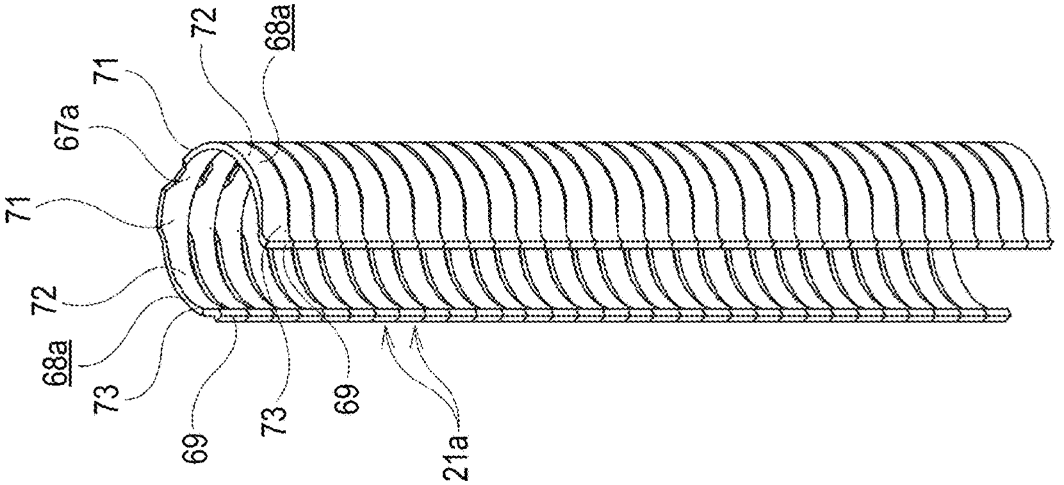
Figure 21A:
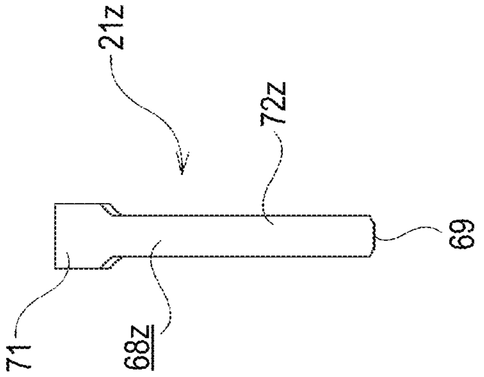
FIGS. 21A to 21D show views similar to FIGS. 19A to 19D according to a comparative example of the second example.
Figure 21B:
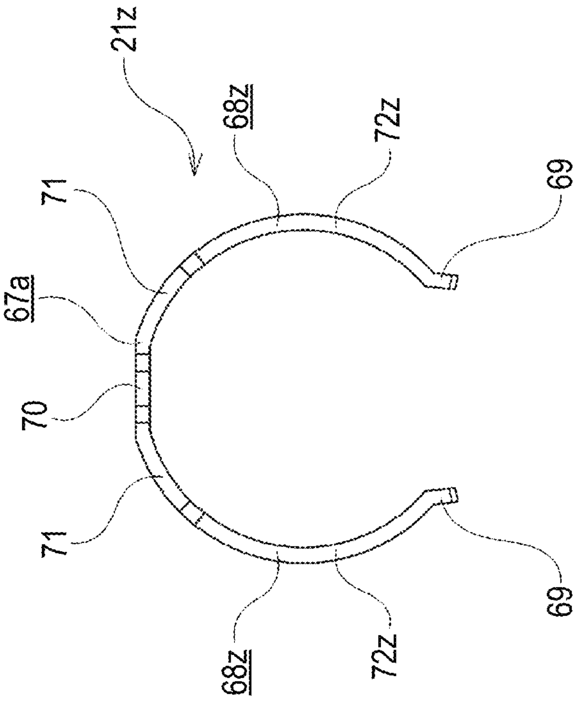
Figure 21C:
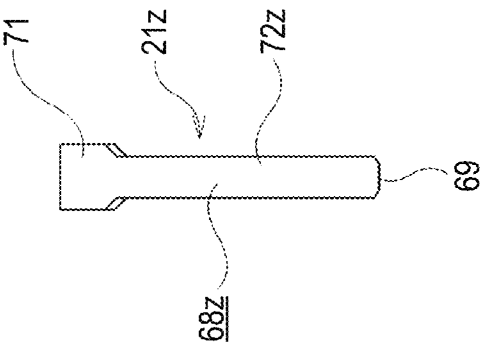
Figure 21D:
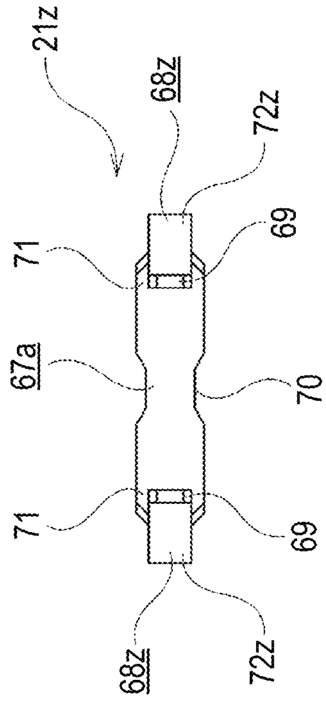

On the other hand, in this example, each of the two arm portions 68*a* constituting the elastic member 21*a* has the base-side wide portion 71 and the tip-side wide portion 73 having the same width dimensions W71 and W73 in the second direction at portions adjacent to both sides of the narrow portion 72 in the circumferential direction. Therefore, as shown in FIGS. 20A 20C, even when the plurality of elastic members 21*a* are overlapped in the axial direction, it is possible to prevent the elastic members 21*a* from being inclined, and thus it is possible to satisfactorily secure handleability of the elastic members 21*a*. Therefore, for example, it is easy to perform so-called bar wrapping in which the periphery is wrapped in a state in which the plurality of elastic members 21*a* are overlapped in the axial direction. And/or, it is easy to set the elastic members 21*a* in a fixed arrangement device in a state of being overlapped in the axial direction.

In the elastic member 21*a* of this example, the base portion 67*a* is implemented by a flat plate, and the base portion 67*a* has the constricted portion 70 in the intermediate portion in the third direction. Therefore, it is easy to perform phase alignment of the elastic member 21*a* with respect to the protruding portion 44 of the holder 19 in the circumferential direction. However, the phase alignment of the elastic member with respect to the holder can be performed by any method such as displaying a mark. In this case, the base portion can be formed in a partially cylindrical shape and/or the constricted portion can be omitted.

As described above, the following contents are disclosed in the present specification.

(1) A worm reducer including:

a housing including a wheel accommodating portion and a worm accommodating portion that is disposed at a skew position with respect to the wheel accommodating portion and whose axially intermediate portion opens to the wheel accommodating portion;

a worm wheel having wheel teeth on an outer circumferential surface thereof and configured to be rotatably supported inside the wheel accommodating portion;

a worm having worm teeth that meshes with the wheel teeth on an outer circumferential surface thereof and configured to be rotatably supported inside the worm accommodating portion;

a holder having a protruding portion that includes two guide portions spaced apart from each other in a third direction orthogonal to both a first direction, which is a direction in which a tip end portion of the worm moves toward and away from the worm wheel, and a second direction, which is an axial direction of the worm accommodating portion, and two holder engagement portions provided on inner side surfaces of the two guide portions facing each other, the holder being disposed between the tip end portion of the worm and the worm accommodating portion;

a pad having a pad base portion that is disposed between the two guide portions, two pad engagement portions that are provided on side surfaces on both sides of the pad base portion in the third direction and are in contact with the two holder engagement portions, and a pad elastic pressing portion that elastically presses a part of the holder in the second direction to apply a preload to a contact portion between the holder engagement portion and the pad engagement portion, the pad being externally fitted to the tip end portion of the worm; and an elastic member installed to extend over the protruding portion and the pad base portion and configured to elastically bias the tip end portion of the worm toward a worm wheel side via the pad, wherein the holder or the pad includes a first grease supply portion for supplying grease to a contact portion between the elastic member and the pad base portion in the vicinity of the contact portion between the elastic member and the pad base portion, and the holder includes a second grease supply portion for supplying grease to a contact portion between the elastic member and the protruding portion in the vicinity of the contact portion between the elastic member and the protruding portion.

(2) The worm reducer according to the above (1), wherein the holder includes a side plate portion bent radially outward from a base end portion of the protruding portion, and the first grease supply portion is provided to penetrate, in the second direction, a portion of the side plate portion whose phase in a circumferential direction substantially coincides with the contact portion between the elastic member and the pad base portion.

(3) The worm reducer according to the above (1) or (2), wherein the second grease supply portion is provided to penetrate, in the radial direction, a portion of the protruding portion whose phase in a circumferential direction substantially coincides with the contact portion between the elastic member and the protruding portion.

(4) The worm reducer according to any one of the above (1) to (3), wherein the protruding portion includes a connection portion that connects an end portion of the two guide portions on a side close to the worm wheel in the first direction.

(5) The worm reducer according to any one of the above (1) to (4), wherein the two holder engagement portions are implemented by two holder inclined surfaces inclined in directions approaching each other as the two holder engagement portions approach one side in the second direction, and the two pad engagement portions are implemented by two pad inclined surfaces in surface contact with the two holder inclined surfaces.

(6) The worm reducer according to any one of the above (1) to (5), wherein the pad elastic pressing portion includes two pad elastic pressing plates located on one side in the second direction with respect to the two pad engagement portions and each extending from a central portion of the pad in the third direction toward a side away from each other in the third direction, each of the two guide portions includes a holder pressed surface on an end surface on the one side in the second direction, and each of the two pad elastic pressing plates elastically presses the holder pressed surface toward the other side in the second direction to apply a preload to the contact portion between the holder engagement portion and the pad engagement portion.

(7) The worm reducer according to the above (6), wherein each of the two pad elastic pressing plates has a slit penetrating in the second direction and extending in the first direction at an end portion on a central side of the pad in the third direction.

(8) The worm reducer according to any one of the above (1) to (7), wherein the elastic member is implemented by a plate spring.

(9) A method for assembling the worm reducer according to any one of the above (1) to (8), the method comprising steps of:

filling the inside of the worm accommodating portion with grease in a state in which the holder, the pad, and the elastic member are assembled inside the worm accommodating portion;

supplying a part of the grease to the contact portion between the elastic member and the pad base portion through the first grease supply portion, and to the contact portion between the elastic member and the protruding portion through the second grease supply portion; and internally fitting the tip end portion of the worm to the pad and disposing the tip end portion in a radially inner side of the holder.

REFERENCE SIGNS LIST

1: electric power steering device
2: steering wheel
3: steering shaft
4: steering column
5*a*, 5*b*: universal joint
6: intermediate shaft
7: steering gear unit
8: electric assist device
9: pinion shaft
10: rack shaft
11: housing
12: rack accommodating portion
13: pinion accommodating portion
14: worm reducer
15: electric motor
16: housing
17: worm wheel
18: worm
19: holder
20, 20*z*: pad
21, 21*a*, 21*z*: elastic member
22: wheel accommodating portion
23: worm accommodating portion
24: wheel tooth
25: worm tooth
26: female spline portion
27: output shaft
28: male spline portion
29: ball bearing
30: small-diameter cylindrical surface portion
31: large-diameter cylindrical surface portion
32: support bearing
33: inner ring
34: outer ring
35: ball
36: bush
37: retainer
38: fitting cylindrical portion
39: inward flange portion
40: wave washer
41: holder inclined surface
42: annular portion
43: side plate portion
44: protruding portion
45: flat portion
46: inner circumferential surface
47: recessed portion
48: stepped portion
49: guide portion
50: connection portion
51: inner side surface
52, 52*a*: holder pressed surface
53, 53*a*: pad inclined surface
54, 54*z*: pad elastic pressing plate
55: pad base portion
56: through hole
57: flat plate portion
58: base portion body
59: base portion overhang portion
60: oval hole portion
61: circular hole portion
62: pressed portion
63: pedestal surface portion
64*a*, 64*b*, 64*c*, 64*d*, 64*e*, 64*f*, 64*z*1, and 64*z*2: ridge
65: slit
66: discontinuous portion
67, 67*a*: base portion
68, 68*a*, 68*z*: arm portion
69: bent portion
70: constricted portion
71: base-side wide portion
72, 72*z*: narrow portion
73: tip-side wide portion
74: first grease supply portion
75: second grease supply portion
76: pad elastic pressing portion
100: worm reducer
101: housing
102: worm wheel
103: worm
104: wheel accommodating portion
105: worm accommodating portion
106: wheel tooth
107: rotation shaft
108: worm tooth
109*a*, 109*b*: ball bearing
110: holder
111: large-diameter portion
112: bush
113: electric motor
114: pad
115: torsion coil spring

The invention claimed is:

1. A worm reducer comprising:

a housing including a wheel accommodating portion and a worm accommodating portion that is disposed at a skew position with respect to the wheel accommodating portion and whose an axially intermediate portion opens to the wheel accommodating portion;

a worm wheel having wheel teeth on an outer circumferential surface thereof and configured to be rotatably supported inside the wheel accommodating portion;

a worm having worm teeth that meshes with the wheel teeth on an outer circumferential surface thereof and configured to be rotatably supported inside the worm accommodating portion;

a holder having a protruding portion that includes two guide portions spaced apart from each other in a third direction orthogonal to both a first direction, which is a direction in which a tip end portion of the worm moves toward and away from the worm wheel, and a second direction, which is an axial direction of the worm accommodating portion, and two holder engagement portions provided on inner side surfaces of the two guide portions facing each other, the holder being disposed between the tip end portion of the worm and the worm accommodating portion;

a pad having a pad base portion that is disposed between the two guide portions, two pad engagement portions that are provided on side surfaces on both sides of the pad base portion in the third direction and are in contact with the two holder engagement portions, and a pad elastic pressing portion that elastically presses a part of the holder in the second direction to apply a preload to a contact portion between the holder engagement portion and the pad engagement portion, the pad being externally fitted to the tip end portion of the worm; and an elastic member installed to extend over the protruding portion and the pad base portion and configured to elastically bias the tip end portion of the worm toward a worm wheel side via the pad, wherein the holder or the pad includes a first grease supply portion for supplying grease to a contact portion between the elastic member and the pad base portion in the vicinity of the contact portion between the elastic member and the pad base portion, and the holder includes a second grease supply portion for supplying grease to a contact portion between the elastic member and the protruding portion in the vicinity of the contact portion between the elastic member and the protruding portion.

2. The worm reducer according to claim 1, wherein the holder includes a side plate portion bent radially outward from a base end portion of the protruding portion, and the first grease supply portion is provided to penetrate, in the second direction, a portion of the side plate portion whose phase in a circumferential direction substantially coincides with the contact portion between the elastic member and the pad base portion.

3. The worm reducer according to claim 1, wherein the second grease supply portion is provided to penetrate, in the radial direction, a portion of the protruding portion whose phase in a circumferential direction substantially coincides with the contact portion between the elastic member and the protruding portion.

4. The worm reducer according to claim 1, wherein the protruding portion includes a connection portion that connects an end portion of the two guide portions on a side close to the worm wheel in the first direction.

5. The worm reducer according to claim 1, wherein the two holder engagement portions are implemented by two holder inclined surfaces inclined in directions approaching each other as the two holder engagement portions approach one side in the second direction, and the two pad engagement portions are implemented by two pad inclined surfaces in surface contact with the two holder inclined surfaces.

6. The worm reducer according to claim 1, wherein the pad elastic pressing portion includes two pad elastic pressing plates located on one side in the second direction with respect to the two pad engagement portions and each extending from a central portion of the pad in the third direction toward a side away from each other in the third direction, each of the two guide portions includes a holder pressed surface on an end surface on the one side in the second direction, and each of the two pad elastic pressing plates elastically presses the holder pressed surface toward the other side in the second direction to apply a preload to the contact portion between the holder engagement portion and the pad engagement portion.

7. The worm reducer according to claim 6, wherein each of the two pad elastic pressing plates has a slit penetrating in the second direction and extending in the first direction at an end portion on a central side of the pad in the third direction.

8. The worm reducer according to claim 1, wherein the elastic member is implemented by a plate spring.

9. A method for assembling the worm reducer according to claim 1, the method comprising:

filling the inside of the worm accommodating portion with grease in a state in which the holder, the pad, and the elastic member are assembled inside the worm accommodating portion;

supplying a part of the grease to the contact portion between the elastic member and the pad base portion through the first grease supply portion, and to the contact portion between the elastic member and the protruding portion through the second grease supply portion; and internally fitting the tip end portion of the worm to the pad and disposing the tip end portion in a radially inner side of the holder.

* * * * *